US009915327B2

(12) United States Patent
Kaltenbach et al.

(10) Patent No.: US 9,915,327 B2
(45) Date of Patent: Mar. 13, 2018

(54) TRANSMISSION FOR A MOTOR VEHICLE

(71) Applicant: ZF Friedrichshafen AG, Friedrichshafen (DE)

(72) Inventors: Johannes Kaltenbach, Friedrichshafen (DE); Eckhardt Lübke, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 186 days.

(21) Appl. No.: 14/654,855

(22) PCT Filed: Dec. 9, 2013

(86) PCT No.: PCT/EP2013/075879
§ 371 (c)(1),
(2) Date: Jun. 23, 2015

(87) PCT Pub. No.: WO2014/108259
PCT Pub. Date: Jul. 17, 2014

(65) Prior Publication Data
US 2015/0345603 A1  Dec. 3, 2015

(30) Foreign Application Priority Data
Jan. 9, 2013 (DE) .......... 10 2013 200 196

(51) Int. Cl.
*F16H 3/08* (2006.01)
*F16H 37/04* (2006.01)
(Continued)

(52) U.S. Cl.
CPC .......... *F16H 37/046* (2013.01); *B60K 6/48* (2013.01); *B60K 6/54* (2013.01); *F16H 3/097* (2013.01);
(Continued)

(58) Field of Classification Search
CPC .................. F16H 37/021; F16H 2003/0931
(Continued)

(56) References Cited

U.S. PATENT DOCUMENTS 6,716,126 B2 * 4/2004 Bowen .................. B60K 6/365
475/276
7,462,121 B2 * 12/2008 Janson .................. B60K 6/387
475/214
(Continued)

FOREIGN PATENT DOCUMENTS

DE  10 2005 044 068 A1   3/2007
DE  10 2010 030 569 A1  12/2011
(Continued)

OTHER PUBLICATIONS

International Search Report Corresponding to PCT/EP2013/075879 dated Apr. 14, 2014.
(Continued)

*Primary Examiner* — Ha Dinh Ho
(74) *Attorney, Agent, or Firm* — Davis & Bujold PLLC; Michael J. Bujold

(57) ABSTRACT

A motor vehicle transmission having at least two sub-transmissions, each with at least one input shaft. The input shafts are arranged on an input side on an input axis. The two sub-transmissions have a single output shaft. A countershaft assembly having two countershafts aligned on a countershaft axis. A main shaft arranged on the input axis can be connected, via range groups, to the output shaft. At least one of the input shafts can connect to the output shaft via at least one of a gear plane, a shift element and the main shaft. At least three shift devices are arranged with at most one of the shift devices is arranged on the countershaft axis. The first
(Continued)

three shift devices are arranged, relative to torque flow, downstream of the input side of the transmission on the input axis.

19 Claims, 21 Drawing Sheets

(51) Int. Cl.
*F16H 3/097* (2006.01)
*B60K 6/54* (2007.10)
*B60K 6/48* (2007.10)
*F16H 3/00* (2006.01)
*F16H 3/093* (2006.01)

(52) U.S. Cl.
CPC ...... *F16H 3/006* (2013.01); *F16H 2003/0818* (2013.01); *F16H 2003/0822* (2013.01); *F16H 2003/0933* (2013.01); *F16H 2200/0056* (2013.01); *F16H 2200/0073* (2013.01); *F16H 2200/0078* (2013.01); *F16H 2200/0086* (2013.01); *Y10S 903/909* (2013.01); *Y10T 74/19014* (2015.01); *Y10T 74/19233* (2015.01)

(58) Field of Classification Search
USPC .................................. 74/330, 331, 333, 340
See application file for complete search history.

(56) References Cited

U.S. PATENT DOCUMENTS

| | | | |
|---|---|---|---|
| 7,621,839 B2* | 11/2009 | Jackson | .................. F16H 3/006 475/214 |
| 7,914,412 B2 | 3/2011 | Gitt | |
| 8,051,732 B2* | 11/2011 | Gitt | ........................ F16H 3/006 74/330 |
| 2013/0288850 A1 | 10/2013 | Kaltenbach | |
| 2013/0337961 A1 | 12/2013 | Kaltenbach | |
| 2014/0305239 A1 | 10/2014 | Lubke et al. | |

FOREIGN PATENT DOCUMENTS

| | | |
|---|---|---|
| EP | 2 444 697 A1 | 4/2012 |
| WO | 2007/115687 A1 | 10/2007 |
| WO | 2012/116867 A1 | 9/2012 |
| WO | 2013/087334 A1 | 6/2013 |

OTHER PUBLICATIONS

Written Opinion Corresponding to PCT/EP2013/075879 dated Apr. 14, 2014.

* cited by examiner

| | K1 | K2 | S11 | S12 | S21 | S22 | S31 | S41 | S42 | i_ | phi |
|---|---|---|---|---|---|---|---|---|---|---|---|
| V1 | X | | | | | | | | | 5.76 | |
| V2 | | X | | X | | | | X | | 4.30 | 1.34 |
| V3 | X | | X | | | | | X | | 3.20 | 1.34 |
| V4 | | X | | | X | | X | | | 2.40 | 1.33 |
| V5 | X | | | X | | | | | X | 1.80 | 1.33 |
| V6 | | X | | | X | | | | X | 1.34 | 1.34 |
| V7 | X | | X | | | | | X | X | 1.00 | 1.34 |
| R1 | | X | | | | X | | | | -5.76 | |
| R2 | | X | | | | X | | | X | -1.80 | |

| | K1 | K2 | S11 | S12 | S21 | S22 | S31 | S41 | S42 | i_ | phi |
|---|---|---|---|---|---|---|---|---|---|---|---|
| V1 | X | | | X | | | | X | | 5.76 | |
| V2 | X | X | X | | X | | | X | | 4.30 | 1.34 |
| V3 | X | X | | | | | | X | | 3.20 | 1.34 |
| V4 | X | | | | | | X | | | 2.40 | 1.33 |
| V5 | X | X | | X | | | | | X | 1.80 | 1.33 |
| V6 | X | | | | X | | | | X | 1.34 | 1.34 |
| V7 | X | | X | | | | | | X | 1.00 | 1.34 |
| R1 | X | | | | | X | | X | | -5.76 | |
| R2 | X | | | | | X | | | X | -1.80 | |

| | K1 | K2 | S11 | S12 | S21 | S22 | S31 | S41 | S42 | S51 | S52 | i_ | phi |
|---|---|---|---|---|---|---|---|---|---|---|---|---|---|
| V1 | X | | | X | | | | | | X | | 18.4 | |
| V2 | | X | | | X | | | X | | X | | 14.8 | 1.25 |
| V3 | X | | X | | | | | X | | X | | 11.8 | 1.25 |
| V4 | | X | | | | | X | | | X | | 9.41 | 1.25 |
| V5 | X | | | X | | | | | | X | | 7.53 | 1.25 |
| V6 | X | | | | X | | | X | | X | | 6.02 | 1.25 |
| V7 | | X | X | | | | | X | X | X | | 4.80 | 1.25 |
| V8 | X | | | X | | | | | X | | X | 3.84 | 1.25 |
| V9 | | X | | | X | | X | | | | X | 3.07 | 1.25 |
| V10 | X | | X | | | | | X | | | X | 2.45 | 1.25 |
| V11 | | X | | X | | | | X | X | | X | 1.96 | 1.25 |
| V12 | X | | | | X | | | | X | | X | 1.57 | 1.25 |
| V13 | | X | X | | | | | | X | | X | 1.25 | 1.25 |
| V14 | | | | X | | | | | X | | X | 1.00 | 1.25 |
| R1 | X | X | | | | X | | X | | X | | −18.4 | |
| R2 | X | X | | | | X | | | X | X | | −7.53 | |

Fig. 6

| | K1 | K2 | S11 | S12 | S21 | S22 | S31 | S41 | S42 | S51 | S52 | S61 | i_L |
|---|---|---|---|---|---|---|---|---|---|---|---|---|---|
| V1 | X | | | X | | | | X | | X | | | 18.1 |
| V2 | | X | X | | X | | | X | | X | | | 14.8 |
| V3 | X | | X | | | | | X | | X | | | 12.0 |
| V4 | | X | | X | | | X | | | X | | | 9.75 |
| V5 | X | | | X | | | | | X | X | | | 7.93 |
| V6 | | X | X | | X | | | | X | X | | | 6.44 |
| V7 | X | | X | | | | | | X | X | | | 5.24 |
| V8 | | X | | X | | | | | | | | X | 4.27 |
| V9 | X | | | X | | | | X | | | X | | 3.46 |
| V10 | | X | X | | X | | | X | | | X | | 2.82 |
| V11 | X | | X | | | | | X | | | X | | 2.29 |
| V12 | | X | | X | | | X | | | | X | | 1.86 |
| V13 | X | | | X | | | | | X | | X | | 1.51 |
| V14 | | X | X | | X | | | | X | | X | | 1.23 |
| V15 | X | | X | | | | | | X | | X | | 1.0 |
| R1 | X | | | X | | X | | X | | X | | | -18.2 |
| R2 | | X | X | | | X | | X | | X | | | -7.93 |

| | K1 | K2 | S11 | S12 | S22 | S21 | S31 | S41 | S42 | S51 | S52 | S61 | i_ |
|---|---|---|---|---|---|---|---|---|---|---|---|---|---|
| V1 | X | | | | | | | | | | | | 18.1 |
| V2 | | X | | X | | | | X | | X | | | 14.8 |
| V3 | X | | X | | | | | X | | X | | | 12.0 |
| V4 | | X | | | X | | X | | | X | | | 9.75 |
| V5 | X | | | X | | | | | X | X | | | 7.93 |
| V6 | | X | X | | | | | | X | X | | | 6.44 |
| V7 | X | | | | X | | | | X | X | | | 5.24 |
| V8 | | | | | | | | | | | | X | 4.27 |
| V9 | | X | | | | | | X | | | X | | 3.46 |
| V10 | X | | | | | | | X | | | X | | 2.82 |
| V11 | | X | X | | | | X | | | | X | | 2.29 |
| V12 | X | | | X | | | | | X | | X | | 1.86 |
| V13 | | X | | | X | | | | X | | X | | 1.51 |
| V14 | X | | X | | | | | X | | | X | | 1.23 |
| V15 | X | | | | | | | | | X | | | 1.0 |
| R1 | X | | | | | X | | | X | X | | | -18.2 |
| R2 | X | | | | | X | | X | X | X | | | -7.93 |

| | K1 | K2 | S11 | S12 | S21 | S22 | S31 | S41 | S42 | S51 | S52 | i_ | phi |
|---|---|---|---|---|---|---|---|---|---|---|---|---|---|
| V1 | X | | X | | | | | | | | | 20.1 | |
| V2 | | X | | | X | | | X | | | | 14.91 | 1.35 |
| V3 | X | | | | | | | X | | X | | 11.01 | 1.35 |
| V4 | | X | | | | X | | X | | | | 8.17 | 1.35 |
| V5 | X | | | X | | | | X | | | | 6.05 | 1.35 |
| V6 | | X | | | | | X | | | | | 4.48 | 1.35 |
| V7 | X | | | | | | | | X | | | 3.32 | 1.35 |
| V8 | | X | | | X | | | | X | | | 2.46 | 1.35 |
| V9 | X | | | | | X | | | X | | | 1.82 | 1.35 |
| V10 | | X | X | | | | | | X | | | 1.35 | 1.35 |
| V11 | X | | | | | | | | | X | | 1.00 | 1.35 |
| R1 | | X | | | | | | X | | | X | -20.2 | |
| R2 | | X | | | | | | | X | | X | -3.34 | |

Fig. 17

|     | K1 | K2 | S11 | S12 | S21 | S22 | S31 | S41 | S42 | S51 | S52 | i_ | phi |
|-----|----|----|-----|-----|-----|-----|-----|-----|-----|-----|-----|------|------|
| V1  | X  |    |     | X   |     |     |     |     |     |     |     | 20.1 |      |
| V2  | X  | X  |     |     | X   |     |     | X   |     |     |     | 14.9 | 1.35 |
| V3  | X  |    |     |     |     |     |     | X   |     | X   |     | 11.0 | 1.35 |
| V4  | X  |    | X   |     |     | X   |     | X   |     |     |     | 8.17 | 1.35 |
| V5  | X  | X  |     |     |     |     |     | X   |     |     |     | 6.05 | 1.35 |
| V6  | X  |    |     | X   |     |     | X   |     |     |     |     | 4.48 | 1.35 |
| V7  | X  |    |     |     | X   |     |     |     | X   |     |     | 3.32 | 1.35 |
| V8  | X  | X  |     |     |     |     |     |     | X   | X   |     | 2.46 | 1.35 |
| V9  | X  |    |     |     |     | X   |     |     | X   |     |     | 1.82 | 1.35 |
| V10 | X  |    | X   |     |     |     |     |     | X   |     |     | 1.35 | 1.35 |
| V11 | X  | X  |     |     |     |     |     | X   |     |     |     | 1.00 | 1.35 |
| R1  | X  |    |     |     |     |     |     |     |     |     | X   | -20.2 |    |
| R2  | X  |    |     |     |     |     |     |     | X   |     | X   | -3.34 |    |

Fig. 19

TRANSMISSION FOR A MOTOR VEHICLE

This application is a National Stage completion of PCT/EP2013/075879 filed Dec. 9, 2013, which claims priority from German patent application serial no. 10 2013 200 196.7 filed Jan. 9, 2013.

FIELD OF THE INVENTION

The invention concerns a transmission, in particular a dual-clutch transmission for a motor vehicle, comprising at least two partial transmissions, wherein each partial transmission has at least one input shaft and wherein the at least two input shafts are arranged on a drive input side along an input shaft axis, an output shaft on a drive output side as the drive output shaft of both partial transmissions, a countershaft assembly, wherein the countershaft assembly comprises at least one countershaft axis with at least two countershafts, at least one main shaft arranged on the input shaft axis and at least one range group, by way of which at least one main shaft can be connected to the drive output shaft, such that at least one of the input shafts can be connected to the drive output shaft by way of at least one wheel plane and/or at least one shifting element and/or at least one main shaft.

BACKGROUND OF THE INVENTION

Transmissions for motor vehicles are designed among others as so-termed dual-clutch transmissions, in which, in each case, an input shaft is associated with a partial transmission and in which the input shafts of the two partial transmissions can be connected by way of a respective powershift element to a drive input, for example an internal combustion engine or an electric machine, wherein the two powershift elements are combined in the form of a dual clutch. The gears that can be obtained by means of such a transmission are then distributed in alternation between the two partial transmissions so that, for example, one partial transmission is used to obtain the even-numbered gears and the corresponding other partial transmission the odd-numbered gears. It is also known to obtain the individual gears by means of one or more wheel stages or wheel planes, each having a different transmission ratio. By means of corresponding shifting elements these can be connected into the force or torque flow between the drive input and the drive output, so that a corresponding, desired transmission ratio between the drive input and the drive output can in each case be obtained.

By virtue of an alternating distribution of the gears between the two partial transmissions it is possible, when driving in a gear associated with one partial transmission, already to pre-select a subsequent gear by appropriate actuation of the shifting devices so that an eventual shift to the subsequent gear is enabled by opening the powershift element of the one partial transmission and shortly thereafter closing the powershift element of the other partial transmission. In this way the gears or gear steps of the transmission can be powershifted, which improves the accelerating ability of the motor vehicle by virtue of a gearshift that is consequently essentially free from traction force interruption, and which makes for more comfortable shifting processes for a vehicle driver.

Such dual-clutch transmissions can also be made with a countershaft assembly provided in addition to the drive input and the drive output, such that a more compact structure in the axial direction is made possible.

From DE 10 2005 044 068 A1 a transmission for a motor vehicle in the form of a dual-clutch transmission is already known. This powershiftable group transmission provides a large number of gears and is particularly suitable for commercial vehicles. A splitter group, a direct gear, a main group and a hollow shaft on a countershaft are provided. Between gears obtained by a change of the input constants within the splitter group without changing the transmission ratio in the main group, gearshifts can be carried out without traction force interruption. In addition, between two adjacent gears obtained by a transmission ratio change in the main group, again gearshifts can be carried out without traction force interruption.

From DE 10 2010 030 569 A1 a further transmission, particularly one for a motor vehicle with a hybrid drive, has become known.

SUMMARY OF THE INVENTION

An objective of the present invention is therefore to make available a transmission for a motor vehicle, which has good powershifting ability and good hybridizing ability. Moreover, an objective of the present invention is to provide a transmission for a motor vehicle which can be produced more simply and inexpensively and which at the same time enables a reliable transmission of torques between the drive input and the drive output. A further objective of the present invention is to indicate an alternative transmission for a motor vehicle.

The present invention achieves these objectives with a transmission, in particular a dual-clutch transmission for a motor vehicle, which comprises at least two partial transmissions, wherein each partial transmission has at least one input shaft and wherein the at least two input shafts are arranged on a drive input side on an input shaft axis, an output shaft on a drive output side as the drive output shaft of both partial transmissions, a countershaft assembly wherein the countershaft assembly has at least one countershaft axis with at least two countershafts, at least one main shaft arranged on the input shaft axis, and at least one range group, by way of which at least one main shaft can be connected to the drive output shaft, wherein at least one of the input shafts can be connected to the drive output shaft by way of at least one wheel plane and/or at least one shifting element and/or at least one main shaft, characterized in that there are N shifting devices, at most one of the N shifting devices is arranged on the at least one countershaft axis, and wherein N is an integer larger than or equal to three and the first three shifting devices are arranged in torque flow downstream from the drive input side of the transmission on the input shaft axis.

The invention also achieves its objective by virtue of a motor vehicle, in particular a passenger or utility vehicle, having a transmission as described below.

One of the advantages achieved thereby is to multiply the gears and reduce the load on the transmission elements of the transmission by virtue of a lower spread, since no extreme transmission ratios are produced by individual wheel planes. Further advantages are that the transmission has good powershifting ability and good hybridization ability.

Preferably in the description and particularly in the claims, the term "wheel stage" or "wheel plane" is understood to mean essentially two transmission elements that cooperate with one another for the transmission of torques from one transmission element to the other transmission element, which wheel plane preferably provides a step-down or step-up ratio in particular for the shafts of the transmission that cooperate with the transmission elements.

Preferably in the description and particularly in the claims, the term "shifting element" is understood to mean a device which has at least an open and a closed condition, such that in the open condition the device transmits no torque and in the closed condition the device can transmit a torque between two devices that cooperate with the device or shifting element.

Preferably in the description and particularly in the claims, the term "shifting device" is understood to mean at least one shifting element and at least one device for actuating the at least one shifting element.

Preferably in the description and particularly in the claims, the term "transmission element" is understood to mean a device by which force and/or torque can be transmitted. Transmission elements can preferably be in the form of wheels, preferably gearwheels, in particular spur gears, bevel gears, worm gears or the like.

Preferably in the description and particularly in the claims, the term "dual shifting element" is understood to mean two shifting elements and two separate shifting element actuating devices, particularly in the form of sliding sleeves, which can be actuated in such manner that at least one of the two shifting elements is closed and the respective other shifting element is at the same time opened.

Further advantageous embodiments, features and advantages of the invention are described in the subordinate claims.

Expediently the countershaft assembly comprises two countershaft axes, each with at least two countershafts. By virtue of this arrangement the forces that occur between transmission elements on the input and countershaft axes are reduced. In the case when the transmission elements are gearwheels, this enables the tooth width to be smaller.

Advantageously, at least two of the input shafts are arranged coaxially with one another and/or at least two of the main shafts are arranged coaxially with one another and/or at least two of the countershafts are arranged coaxially with one another. This reduces the fitting space occupied, for example by the at least two input shafts. Thus, the transmission can also be used in a motor vehicle when space is restricted.

Expediently, at least one of the input shafts and/or at least one of the countershafts and/or at least one of two main shafts is in the form of a hollow shaft and the respective other shaft is a solid shaft. This makes for a particularly space-saving arrangement, for example of the two input shafts, since the input shaft in the form of a hollow shaft can be arranged coaxially with and parallel to the solid input shaft. With the design as a solid shaft and/or as a hollow shaft, in each case transmission elements that have to be connected fixed to the solid or hollow shaft can be made integrally with the shaft concerned, and therefore inexpensively. Thus, a time-consuming and thus costly fixing of respective transmission elements to the corresponding shafts can be dispensed with.

Advantageously, the shifting devices comprise one and/or two shifting elements. If the shifting device has only one shifting element the flexibility of the transmission is increased, since each shifting element can be actuated independently of other shifting elements. If the shifting device comprises two shifting elements, these can be actuated together by one shifting element actuating device, which saves space and costs.

Expediently, at least one gear that can be obtained by the transmission can be bypassed by means of the countershaft assembly to at least the first two of the shifting devices arranged in the torque flow downstream from the drive input side. By virtue of this design measure through-going powershifting of the whole transmission is ensured.

Advantageously, at least one reverse gear is provided. Thus, the rotational direction of the drive output shaft relative to one of the input shafts can be reversed. By virtue of the at least one reverse gear, the flexibility with regard to using the transmission in a variety of vehicles is substantially increased.

Expediently, the at least one reverse gear and a first forward gear can be engaged by way of the same powershift element. With this arrangement only one of the powershift elements has to be designed as a starting clutch. Thus, the structure of the transmission as a whole is considerably simplified.

Advantageously, the at least one reverse gear can be actuated by means of at least one of the N shifting devices, the at least one shifting device being the second shifting device which is arranged in the torque flow downstream from the drive input side. An advantage of this arrangement is that with the transmission the reverse gear can be obtained in a simple manner.

Expediently, one of the N shifting devices comprises a single shifting element, which is arranged on the input shaft axis after at least the first two, in particular the first three of the N shifting devices in the torque flow downstream from the drive input side. In this way, a further force and torque path for a gear is provided by simple means, so that the flexibility is increased, on the one hand, with regard to obtaining various gears and, on the other hand, with regard to the use of the transmission in different motor vehicles.

Advantageously, the at least one range group is designed as a planetary gear assembly or as a countershaft assembly. By virtue of the planetary gear assembly, or the range group designed as a countershaft assembly, the number of gear steps of both partial transmissions is doubled so that for a larger number of vehicles a large enough number of gears or gear steps can be provided.

Expediently, first and second range groups are provided, wherein the first and second range groups are in the form of planetary gear assemblies and/or countershaft assemblies. By virtue of this design measure thanks to a compact structure reliable shifting ability of the transmission is ensured and the number of gear steps is quadrupled. If both the first and second range groups are countershaft assemblies, an essential advantage given by this is that no separate, complex planetary gear assembly has to be provided, and thus is more simple and less costly.

Preferably the transmission has a sun shaft on the input shaft axis, which on the one hand can be coupled to one of the input shafts and on the other hand is connected to the sun gear of the planetary gear assembly. This further increases the flexibility of the transmission so that numerous gears or gear steps of the transmission can be obtained with the transmission.

Expediently, the shifting device for actuating the planetary gear assembly comprises at least one shifting element, and by means of the at least one shifting element a ring gear of the planetary gear assembly can be connected to a housing of the transmission. One of the resulting advantages is that the ring gear of the planetary gear assembly can either be rotationally fixed or allowed to rotate freely, which further increases the number of possible gear steps or transmission ratios. Besides, a gear ratio in the fast range is made possible.

Advantageously, the shifting device for actuating the planetary gear assembly comprises two shifting elements, such that by means of one of the shifting elements the ring gear can be connected to a planetary carrier of the planetary gear assembly. The advantage of this is that it enables block rotation of the planetary gear assembly.

Expediently, in order to hybridize the transmission an electric machine is arranged on at least one transmission element of a wheel plane and/or on at least one countershaft and/or on at least one of the shafts on the input shaft axis, in particular by means of an additional shifting device and/or a transmission element connected thereto.

One of the advantages achieved thereby is that the transmission can also be used in hybrid vehicles, in which both an electric machine and an internal combustion engine cooperate with the transmission for the transmission of force and torque to the drive output of the hybrid vehicle. For this, the at least one electric machine can be connected to at least one of the input shafts, to the sun shaft or to the drive output shaft, or to at least one of the countershafts. The electric machine can also be connected to a transmission element of one of the wheel planes which is a loose wheel. The corresponding transmission element can then be coupled to the shaft concerned by means of a shifting element.

It is also possible to connect the electric machine to a transmission element which is a fixed wheel, i.e. a transmission element connected firmly to one of the shafts of the transmission. In this case it is particularly advantageous for the electric machine to be connected to the transmission by way of at least one shifting element, in particular to a transmission element of a wheel plane. The advantage achieved by this first connection option is that a so-termed static load ability and electric driving without drag losses in the transmission are possible. In this connection explicit reference is made to the disclosure content of DE 10 2010 030 569 A1.

In this case a first input shaft can be coupled with a powershift element, and a second input shaft, in particular one arranged coaxially with the first input shaft, is connected directly to a rotor of the electric machine for its drive input. For this, two parallel force transmission branches can be coupled with one another on the input side.

A second possible way to connect or couple the electric machine to the transmission is by arranging a planetary gear assembly in the transmission. Then, an internal combustion engine can be coupled to a first input shaft by an appropriate shifting element, particularly in the form of a separator clutch. The electric machine engages on the one hand with a second input shaft and on the other hand with the first input shaft of the transmission by way of a planetary gear assembly. When the separator clutch is actuated, i.e. closed, the internal combustion engine is also coupled by the planetary gear assembly to the second input shaft. The planetary gear assembly, comprising a sun gear, a ring gear, planetary gearwheels and a planetary carrier, is in this case designed such that, and cooperates with the internal combustion engine and the electric machine in such manner that, the planetary carrier engages with the second input shaft. The electric machine is coupled to the sun gear of the planetary gear assembly. Moreover, a further shifting element in the form of a bridging shifting element can be provided, which cooperates with the planetary gear assembly in such manner that when the bridging shifting element is actuated there is a rotationally fixed connection between the electric machine, the first input shaft and the second input shaft, whereas in contrast when the bridging shifting element in not actuated, i.e. open, the rotationally fixed connection between the electric machine and the first and second input shafts does not exist and in particular, therefore, the rotation speeds of the two input shafts are not equal.

If a further shifting element is arranged between the shifting element that serves to connect the internal combustion engine to the first input shaft and the bridging shifting element, then by means of this further shifting element, in particular in the form of a dual shifting element, both the aforesaid first connection option and the aforesaid second connection option can be implemented by actuating the further shifting element.

Expediently the N shifting devices, at least six wheel planes and in particular at least nine wheel planes and the at least one range group are so arranged that at least seven forward gears, in particular at least 15 forward gears, and at least two reverse gears can be obtained by the transmission, which in particular are fully powershiftable. An advantage is the high flexibility and reliability of the transmission, so that it is suitable for use in a large number of the most varied motor vehicles. Moreover, by virtue of the large number of forward gears a motor vehicle with this transmission can be better operated in the optimum working range of the internal combustion engine, thereby in particular reducing fuel costs.

Advantageously, at least one and in particular two drive input constants are provided. An essential advantage is that the drive input constants enable the transmission of force and torque by simply designed means, so the transmission also withstands more severe loading.

Expediently, at least one of the shifting devices is in the form of a dual shifting element. The use of a dual shifting element has the advantage that the transmission can be built even more compactly and so takes up a minimum of fitting space in the motor vehicle, while at the same time its flexibility compared with shifting devices having two shifting elements is increased since with the two shifting elements respectively different shafts can be engaged.

Further important features and advantages of the invention emerge from the claims, the drawings and the associated figure descriptions that refer to the drawings.

It is understood that the features previously mentioned and still to be explained below can be used not only in the combination indicated in each case, but rather, in other combinations as well or in isolation, without going beyond the scope of the present invention.

BRIEF DESCRIPTION OF THE DRAWINGS

Preferred designs and embodiments of the present invention are illustrated in the drawings and will be explained in greater detail in the description that follows, wherein the same indexes are used for the same, or similar, or functionally equivalent components or elements.

The drawings show, in schematic form:

FIG. 2; A shifting matrix for a transmission according to the first embodiment of the present invention;

FIG. 4: A shifting matrix for a transmission according to the second embodiment of the present invention;

FIG. 6: A shifting matrix for a transmission according to the third embodiment of the present invention;

FIG. 10: A shifting matrix for a transmission according to the sixth embodiment of the present invention;

FIG. 12: A shifting matrix for a transmission according to the seventh embodiment of the present invention;

FIG. 17: A shifting matrix for a transmission according to the eleventh embodiment of the present invention;

FIG. 19: A shifting matrix for a transmission according to the twelfth embodiment of the present invention;

DETAILED DESCRIPTION OF THE PREFERRED EMBODIMENTS

Figure 1:
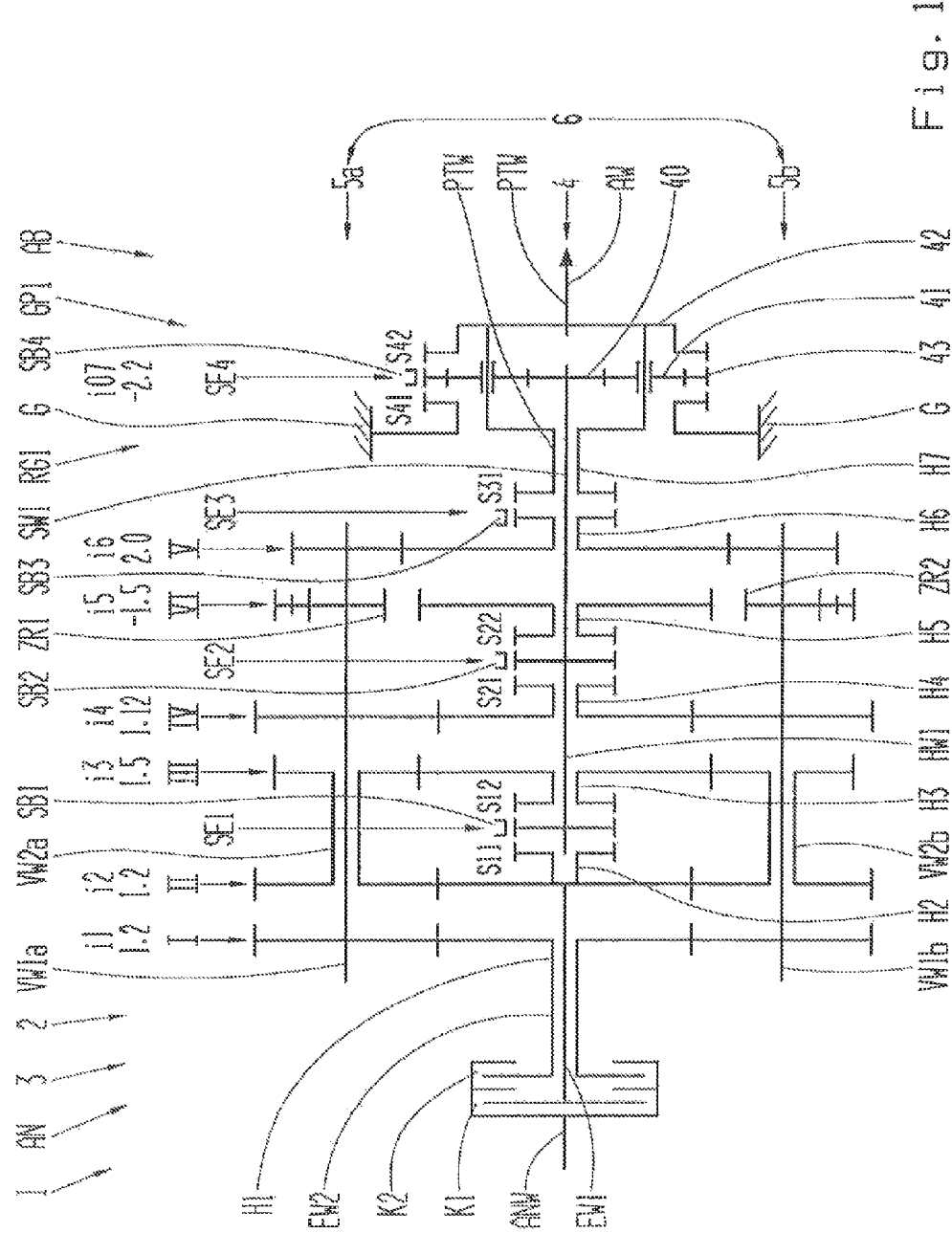
FIG. 1: A transmission according to a first embodiment of the present invention.

FIG. 1 shows a transmission according to a first embodiment of the present invention.

In FIG. 1 the index 1 denotes a transmission in the form of a dual-clutch transmission. The dual-clutch transmission 1 comprises two powershift elements in the form of clutches K1, K2. By means of the dual clutches K1, K2, the drive input side AN can be coupled or connected to the drive output side AB of the transmission 1 for the transmission of force and torques. For this, the first clutch K1 is connected to a first input shaft EW1 and the second clutch K2 is connected to a second input shaft EW2. The first input shaft EW1 is in the form of a solid shaft, while in contrast the second input shaft EW2 is a hollow shaft H1. The two input shafts EW1, EW2 are arranged parallel to and coaxially with one another. A drive input shaft ANW connects the two clutches K1, K2, for example to a motor.

In addition the transmission 1 comprises two partial transmissions 2, 3. The first partial transmission 2 can be coupled to the first input shaft EW1 and the second partial transmission to the second input shaft EW2. With the first partial transmission 2 is associated at least the second wheel plane II, while in contrast at least the first wheel plane I is associated with the second partial transmission 3.

Furthermore, the transmission 1 comprises an input shaft axis 4 on which the two input shafts EW1, EW2 are arranged. In addition, on the input shaft axis 4 in the torque flow downstream from the two input shafts EW1, EW2 is arranged a first main shaft HW1 in the form of a first sun shaft SW1. The first sun shaft SW1 is also connected to a sun gear 40 of a first planetary gear assembly GP1. Finally, the planetary gear assembly PG1 can be coupled or connected to a drive output shaft AW on the input shaft axis 4. Furthermore, the planetary gear assembly GP1 comprises planetary gearwheels 41 mounted to rotate on a planetary carrier 42 or web 42. Farther outward in the radial direction is arranged a ring gear 43 with which the planetary gearwheels 41 engage, as they also do with the sun gear 40. The planetary carrier 42 of the planetary gear assembly GP1 is connected in the torque flow downstream with a planetary carrier shaft PTW in the form of a solid shaft, which is designed to be the drive output shaft AW. Upstream in the flow of torque, the planetary carrier 42 is connected to a planetary carrier shaft PTW in the form of a hollow shaft. The planetary gear assembly GP1 serves as a first range group RG1.

In the flow of torque- and force, downstream from the drive input side AN of the transmission 1, starting from the two clutches K1, K2, the transmission 1 comprises a first wheel plane I, a second wheel plane II, a first shifting element S11, a second shifting element S12, a third wheel plane III, a fourth wheel plane IV, a third shifting element S21, a fourth shifting element S22, a sixth wheel plane VI in the form of a reverse gear step, a fifth wheel plane V, a fifth shifting element 31, and a range group RG1 in the form of a planetary gear assembly GP1, which can be actuated by means of a sixth shifting element 341 and a seventh shifting element S42.

Each of the wheel planes I, II, III, IV, V and VI comprises transmission elements, particularly in the form of gearwheels, in each case connected to a shaft of the transmission 1.

In each case, parallel to the input shaft axis 4 are arranged two countershaft axes 5a, 5b for a countershaft assembly 6. The countershaft assembly 6 comprises a countershaft VW1a in the form of a solid shaft with a countershaft VW2a in the form of a hollow shaft arranged parallel to and coaxial with it on the first countershaft axis 5a, and a countershaft VW1b in the form of a solid shaft with a countershaft VW2b in the form of a hollow shaft arranged parallel to and coaxial with it on the second countershaft axis 5b. Between the input shaft axis 4 and, respectively, each of the countershaft axes 5a, 5b the sixth wheel plane VI comprises in each case an intermediate wheel ZR1, ZR2 for reversing the rotational direction, so that by means of the drive output shaft AW but with the same rotational direction of the input shafts EW1, EW2, a reversed rotational direction for obtaining at least one reverse gear can be obtained. Thus, the sixth wheel plane VI is designed as the reverse gear stage.

Beginning from the drive input side AN, the countershaft axis 5a, 5b comprises in each case the first wheel plane I, the second wheel plane II, the third wheel plane III, the fourth wheel plane IV, the sixth wheel plane VI in the form of a reverse gear stage, and the fifth wheel plane V.

Below, the seven shifting elements S11, S12, S21, S22, S31, S41 and S42 will now be described.

The first shifting element S11 is arranged on the input shaft axis 4 and connected on the one hand to a second hollow shaft H2 and on the other hand to the first main shaft HW1, in the form of the first sun shaft SW1. The second hollow shaft H2 is arranged coaxially with and parallel to the first input shaft EW1 and is functionally connected thereto. When actuated, the first shifting element S11 forms a connection between the second hollow shaft H2 and the first main shaft HW1 for the transmission of force and torques. Both with the second hollow shaft H2 and with the first input shaft EW1 a transmission element is connected on the input shaft axis 4, which cooperates with respective transmission elements on the two countershafts VW2a, VW2b of the countershaft axes 5a. 5b to form the second wheel plane II.

The second shifting element S12 is arranged on the input shaft axis 4 and connected on the one hand to a third hollow shaft H3 and on the other hand to the first main shaft HW1 or first sun shaft SW1, and when actuated, forms a connection for the transmission of force and torques between the third hollow shaft H3 and the first main shaft HW1. The third hollow shaft H3 is in this case arranged coaxially with and parallel to the first main shaft HW1 or first sun shaft SW1, radially on the outside thereof. On the third hollow shaft H3 is arranged a transmission element, which cooperates with respective transmission elements on the two countershafts VW2a, VW2b of the countershaft axes 5a, 5b to form the third wheel plane III.

The first shifting element S11 and the second shifting element S12 are combined together in a first shifting device SE1 and can be actuated by a common shifting element actuating device SB1.

The third shifting element S21 is arranged on the input shaft axis 4 and connected on the one hand to the first main shaft HW1 or first sun shaft SW1 and on the other hand to a fourth hollow shaft H4, and when actuated, forms a connection for the transmission of force and torques between the fourth hollow shaft H4 and the first main shaft HW1. The fourth hollow shaft H4 is arranged coaxially with and parallel to the first main shaft HW1, radially on the outside thereof. On the fourth hollow shaft H4 is arranged a transmission element, which cooperates with respective transmission elements on the two countershafts VW1a, VW1b to form the fourth wheel plane IV. The fourth shifting element S22 is arranged on the input shaft axis 4 and connected, on the one hand, to the first main shalt HW1 or first sun shaft SW1 and, on the other hand, to a fifth hollow shaft H5, and when actuated, forms a connection for the transmission of force and torques between the fifth hollow shaft H5 and the first main shaft HW1. The fifth hollow shaft H5 is arranged coaxially with and parallel to the first main shaft HW1, radially on the outside thereof. On the fifth hollow shaft H5 is arranged a transmission element, which cooperates with respective intermediate wheels ZR1, ZR2 between the input shaft axis 4 and in each case one of the two countershaft axes 5a, 5b and a respective transmission element on the two countershafts VW1a, VW1b, to form the sixth wheel plane VI in the form of the reverse gear stage.

The third shifting element S21 and the fourth shifting element S22 are combined in a second shifting device SE2 and can be actuated by means of a common shifting element actuating device SB2.

The fifth shifting element S31 is arranged on the input shaft axis 4 and enables a connection between a sixth hollow shaft H6 and a seventh hollow shaft H7. The seventh hollow shaft H7 is in the form of a planetary carrier shaft PTW and is also connected to the planetary carrier 42 of the planetary gear assembly GP. When actuated, the fifth shifting element S31 forms a connection for the transmission of force and torque between the sixth hollow shaft H6 and the planetary carrier shaft PTW. The fifth shifting element S31 is arranged in a third shifting device SE3 and can be actuated by means of a third shifting element actuating device SB3. The sixth hollow shaft H6 and the planetary carrier shaft PTW are at least partially arranged coaxially with and parallel to the first sun shaft SW1, radially on the outside thereof.

The sixth shifting element S41 is arranged on the input shaft axis 4 and is connected, on the one hand, to the ring gear 43 of the planetary gear assembly GP1 and, on the other hand, to the housing G of the transmission 1, and when actuated, rotationally fixes the ring gear 43 of the transmission 1 relative to the housing G of the transmission 1, The seventh shifting element 842 is connected, on the one hand, to the ring gear 43 of the planetary gear assembly GP1 and, on the other hand, to the planetary carrier 42 or web of the planetary gear assembly GP1, and when actuated, forms a rotationally fixed connection between the ring gear 43 and the planetary carrier 42 of the planetary gear assembly GP1.

The sixth shifting element 841 and the seventh shifting element 842 are arranged in a common, fourth shifting device SE4 and can be actuated by means of a common fourth shifting element actuating device SB4.

In all, the transmission 1 according to FIG. 1 comprises two input shafts EW1, EW2 on the input shaft axis 4, the first input shaft EW1 being in the form of a solid shaft and the second input shaft EW2 being in the form of a hollow shaft and being arranged coaxially with and parallel to the first one. On the countershaft axes 5a, 5b parallel to the input shaft axis 4 there are respective countershafts VW1a, VW1b made as solid shafts, and in each case parallel to and coaxial with these, respective countershafts VW2a, VW2b in the form of hollow shafts. On the input shaft axis 4, in the direction toward the drive output shaft AW, besides the two input shafts EW1, EW2 there is arranged a first main shaft HW1 in the form of a first sun shaft SW1, which is connected to a sun gear 40 of a planetary gear assembly GP1. In addition the planetary gear assembly GP1 is connected to the drive output shaft AW, which is also arranged on the input shaft axis 4. In this case a planetary carrier shaft PTW connected to a planetary carrier 42 forms the drive output shaft AW.

The transmission according to FIG. 1 comprises six wheel planes I, II, III, IV, V and VI, the sixth wheel plane forming the reverse gear stage. All the wheel planes I to VI are in particular spur gear stages with discrete transmission ratios. Each wheel plane I, II, III, IV, V and VI comprises three transmission elements, in particular in the form of gearwheels, Between the input shaft axis 4 and the two countershaft axes 5a, 5b the reverse gear stage VI comprises respective intermediate wheels ZR1, ZR2. Thus, in total 20 transmission elements, in particular in the form of gearwheels are provided for the wheel planes. Furthermore, between the first sun shaft SW1 and the drive output shaft AW there is arranged a range group RG1 in the form of a planetary gear assembly GP1.

In addition, in FIG. 1 the transmission ratios of the individual wheel planes I, II, III, IV, V and VI and that of the planetary gear assembly are shown. The first wheel plane has a transmission ratio i1 of 1.2. The second wheel plane II has a transmission ratio i2 of 1.2, The third wheel plane III has a transmission ratio i3 of 1.5. The fourth wheel plane IV has a transmission ratio i4 of 1.12. The sixth wheel plane VI has a transmission ratio i5 of −1.5. The fifth wheel plane V has a transmission ratio i6 of 2.0. The planetary gear assembly GP has a transmission ratio i07 of −2.2.

FIG. 2 shows a shifting matrix for a transmission according to the first embodiment of the present invention.

In FIG. 2 a shifting matrix for a transmission 1 according to FIG. 1 is shown. Horizontally columns are shown, each for a shifting element S11, S12, S21, S22, S31, S41 and S42 and for the two clutches K1 and K2. In addition the absolute transmission ratio i_ of the individual gear steps and the relative transmission ratio phi between the next-lower gear and the current gear is shown. Perpendicular to this and downward, the seven forward gears denoted by the indexes V1 to V7 are shown, as well as two reverse gears denoted by R1 and R2. The cells in the shifting matrix left empty, for example, in the forward gear V1, the shifting elements S11, S21, S22, S31 and S42, and the clutch K2, indicate that the corresponding shifting elements and the corresponding clutch are open, i.e. that the shifting elements and clutch in those cases transmit no forces or torque between the respective shafts linked or connected to the shifting element or clutch concerned. A cell filled with an X in the shifting matrix denotes a correspondingly actuated or closed shifting element or clutch; for example in the shifting matrix, to obtain the forward gear V1, the clutch K1 and the shifting elements S12 and S41 are closed.

Unless otherwise stated in what follows, all the clutches K1, K2 and all the shifting elements S11, S12, S21, S22, S31, S41 and S42 are in each case open.

To obtain the first forward gear V1, by means of the transmission 1, according to FIG. 2, the clutch K1 and the shifting elements S12 and S41 are closed. To obtain the second forward gear V2, the clutch K2 and the shifting elements S21 and S41 are closed. To obtain the third forward gear V3, the clutch K1 and the shifting elements S11 and S41 are closed. To obtain the fourth forward gear V4, the second clutch K2 and the shifting element S31 are closed. To obtain the fifth forward gear V5, the first clutch K1 and the shifting elements S12 and S42 are closed, To obtain the sixth forward gear V6, the clutch K2 and the shifting elements S21 and S42 are closed. To obtain the seventh forward gear V7, the first clutch K1 and the shifting elements S11 and S42 are closed. To obtain the first reverse gear R1, the clutch K2 and the shifting elements S22 and S41 are closed, To obtain the second reverse gear R2, the clutch K2 and the shifting elements S22 and S42 are closed.

The absolute transmission ratio i_ of the first forward gear V1 is 5.76. The absolute transmission ratio i_ of the second forward gear V2 is 4.30 and the relative transmission ratio phi between the first forward gear V1 and the second forward gear V2 is 1.34.

The absolute transmission ratio i_ of the third forward gear V3 is 3.20 and the relative transmission ratio phi between the second V2 and the third V3 forward gears is 1.34. The absolute transmission ratio i_ of the fourth forward gear V4 is 2.40 and the relative transmission ratio phi between the third V3 and the fourth V4 forward gears is 1.34.

The absolute transmission ratio i_ of the fifth forward gear V5 is 1.80 and the relative transmission ratio phi between the fourth V4 and the fifth V5 forward gears is 1.34. The absolute transmission ratio i_ of the sixth forward gear V6 is 1.34 and the relative transmission ratio phi between the fifth V5 and the sixth V6 forward gears is 1.34.

The absolute transmission ratio i_ of the seventh forward gear V7 is 1.00 and the relative transmission ratio phi between the sixth V6 and seventh V7 forward gears is 1.34. The absolute transmission ratio i_ of the first reverse gear R1 is −5.76. The absolute transmission ratio i_ of the second reverse gear R2 is −1.80.

Figure 3:
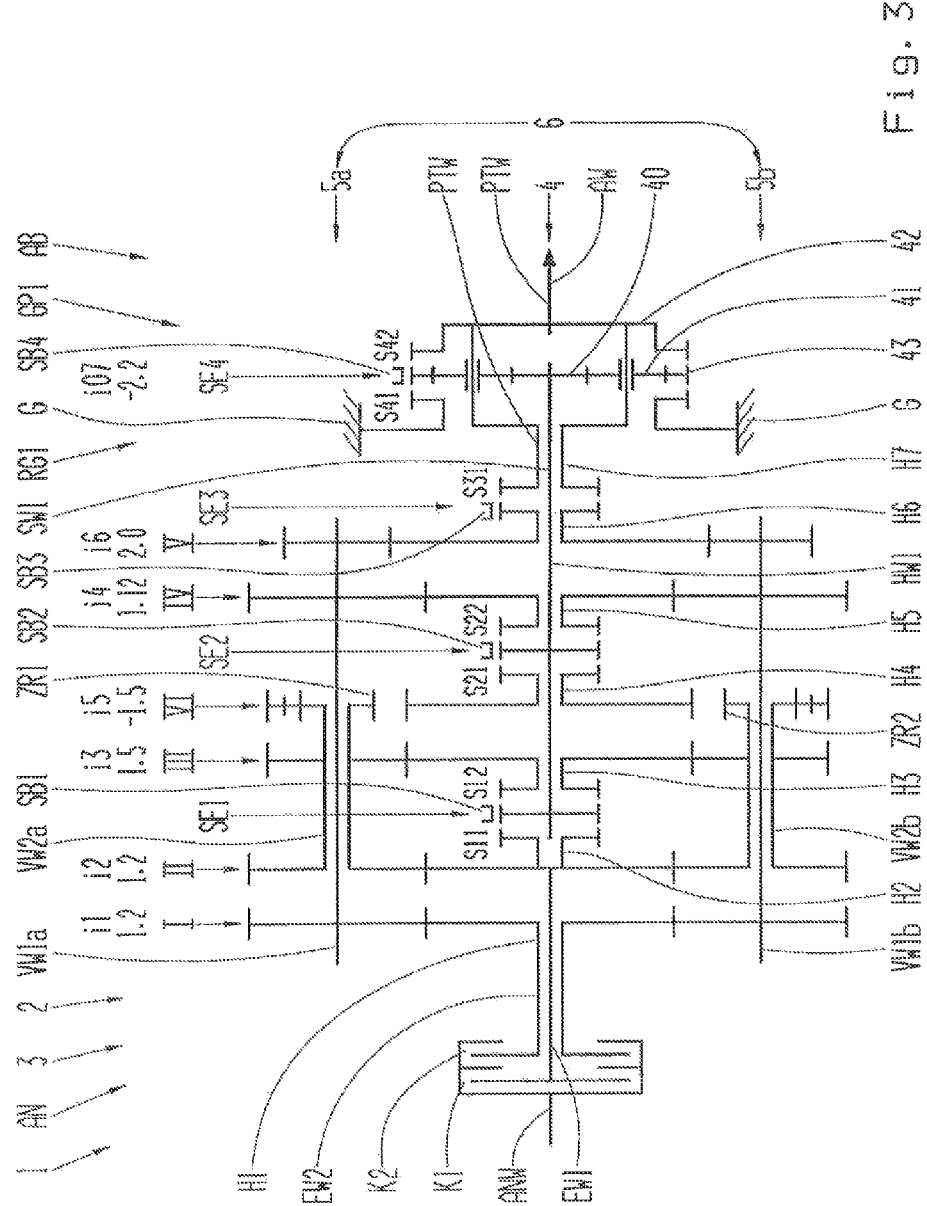
FIG. 3: A transmission according to a second embodiment of the present invention.

FIG. 3 shows a transmission according to a second embodiment of the present invention.

FIG. 3 shows a transmission substantially according to FIG. 1. The difference from the transmission 1 according to FIG. 1 is that in the transmission 1 according to FIG. 3 the reverse gear stage VI is arranged between the third wheel plane III and the fourth wheel plane IV. For this purpose the corresponding transmission element is arranged on the fourth hollow shaft H4, which element cooperates respectively with the intermediate wheel ZR1, ZR2 between the input shaft axis 4 and one of the two countershaft axes 5a, 5b and the corresponding transmission elements on the two countershafts VW2a, VW2b, to form the sixth wheel plane VI in the form of the reverse gear stage. Furthermore, the countershafts VW2a, VW2b extend in the axial direction from the second wheel plane II through the third wheel plane III as far as the sixth wheel plane VI. The reverse gear stage VI can be engaged by means of the third shifting element S21.

Furthermore, FIG. 3 shows the transmission ratios of the individual wheel planes I, II, III, IV, V and VI and that of the planetary gear assembly GP. The first wheel plane I has a transmission ratio i1 of 1.2. The second wheel plane II has a transmission ratio i2 of 1.2. The third wheel plane III has a transmission ratio i3 of 1.5. The sixth wheel plane VI has a transmission ratio i5 of −1.5. The fourth wheel plane IV has a transmission ratio i4 of 1.12. The fifth wheel plane V has a transmission ratio i6 of 2.0. The planetary gear assembly GP has a transmission ratio i07 of −2.2.

FIG. 4 shows a shifting matrix for a transmission according to the second embodiment of the present invention.

Unless otherwise stated below, all the clutches K1, K2 and all the shifting elements S11, S12, S21, S22, S31, S41 and S42 are in each case open.

FIG. 4 shows a shifting matrix for a transmission according to FIG. 3. Unless expressly stated in what follows, the clutches K1, K2 and all the shifting elements S11, S12, S21, S22, S31, S41 and S42 are open.

The manner of obtaining the forward gears V1 to V7 is the same as how the gears V1 to V7 are obtained according to FIG. 2. To avoid repetition, reference should be made to the description relating to FIG. 2.

To obtain the first reverse gear R1 the clutch K1 and the shifting elements S22 and S41 are closed. To obtain the second reverse gear R2 the clutch K1 and the shifting elements S22 and S42 are closed.

The absolute transmission ratio i_ of the first forward gear V1 is 5.76. The absolute transmission ratio i_ of the second forward gear V2 is 4.30 and the relative transmission ratio phi between the first forward gear V1 and the second forward gear V2 is 1.34.

The absolute transmission ratio i_ of the third forward gear V3 is 3.20 and the relative transmission ratio phi between the second forward gear V2 and the third forward gear V3 is 1.34, The absolute transmission ratio i_ of the fourth forward gear V4 is 2.40 and the relative transmission ratio phi between the third forward gear V3 and the fourth forward gear V4 is 1.34.

The absolute transmission ratio i_ of the fifth forward gear V5 is 1.80 and the relative transmission ratio phi between the fourth forward gear V4 and the fifth forward gear V5 is 1.34. The absolute transmission ratio i_ of the sixth forward gear V6 is 1.34 and the relative transmission ratio phi between the fifth forward gear V5 and the sixth forward gear V6 is 1.34.

The absolute transmission ratio i_ of the seventh forward gear V7 is 1.00 and the relative transmission ratio phi between the sixth forward gear V6 and the seventh forward gear V7 is 1.34. The absolute transmission ratio i_ of the first reverse gear R1 is −5.76. The absolute transmission ratio i_ of the second reverse gear R2 is −1.80.

Figure 5:
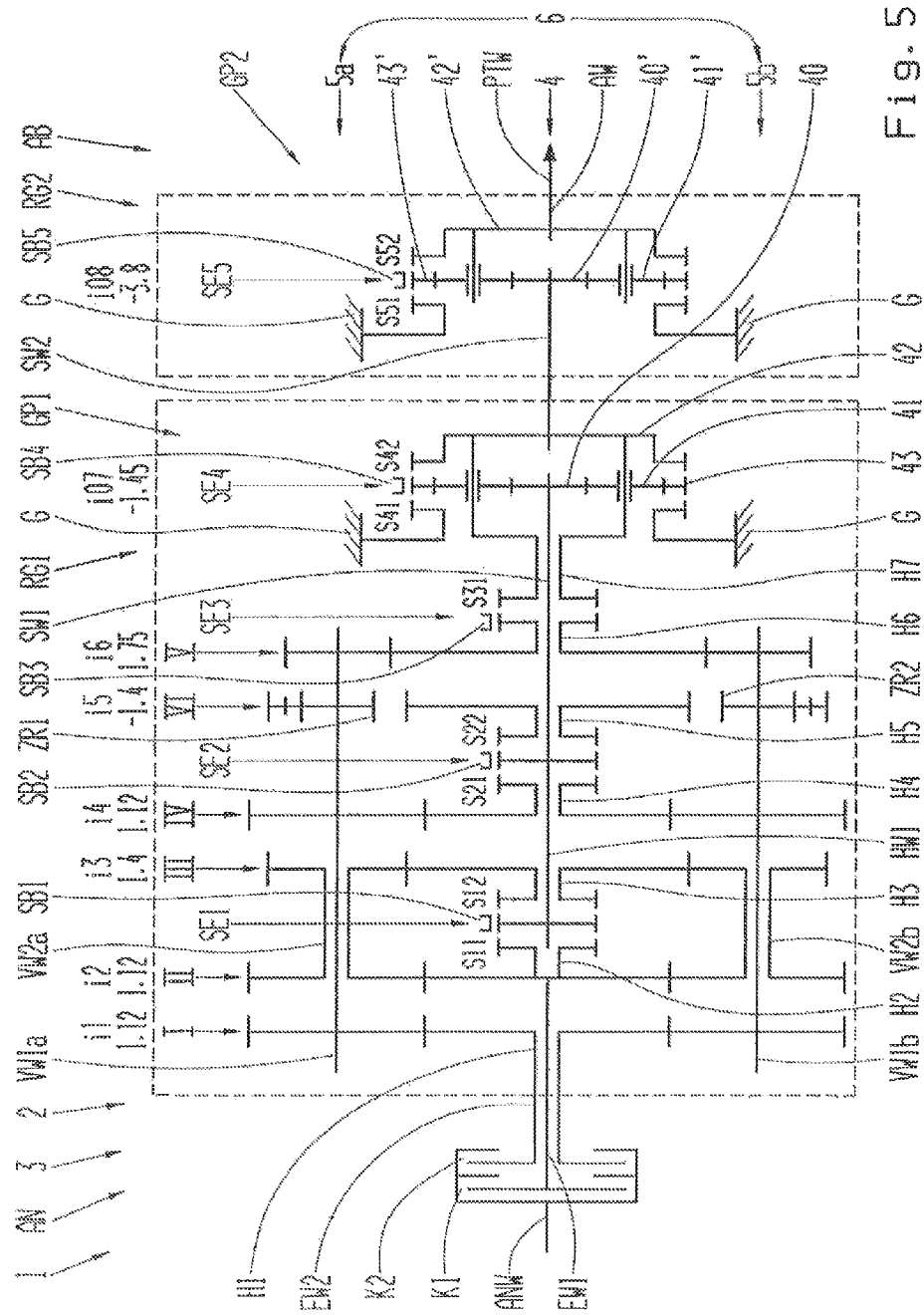
FIG. 5: A transmission according to a third embodiment of the present invention.

FIG. 5 shows a transmission according to a third embodiment of the present invention.

FIG. 5 shows a transmission substantially according to FIG. 1. The difference from the transmission 1 according to FIG. 1 is that in the transmission 1 according to FIG. 5, a second range group RG2 in the form of a second planetary gear assembly GP2 is provided. The planetary carrier or web 42 of the first planetary gear assembly GP1 is connected to a second sun shaft SW2. This is connected to a sun gear 40' of the second planetary gear assembly GP2. The second sun shaft SW2 is a solid shaft and is arranged on the main shaft axis 4. In contrast to the transmission 1 according to FIG. 1, in the transmission 1 according to FIG. 5 fourteen gears can now be obtained by virtue of the second range group RG2 in the form of a planetary gear assembly GP2.

The second planetary gear assembly GP2 has an eighth shifting element S51 and a ninth shifting element S52. The eighth shifting element S51 is arranged on the input shaft axis 4 and connected, on the one hand, to the ring gear 43' of the second planetary gear assembly GP2 and on the other hand to the housing G of the transmission 1, and when actuated, forms a rotationally fixed connection between the ring gear 43' of the transmission 1 and the housing G of the transmission 1. The ninth shifting element S52 is connected on the one hand to the ring gear 43' of the second planetary gear assembly GP2 and on the other hand to the planetary carrier 42' or web of the second planetary gear assembly GP2, and when actuated, forms a rotationally fixed connection between the ring gear 43' and the planetary carrier 42' of the second planetary gear assembly GP2.

The eighth shifting element S51 and the ninth shifting element S52 are arranged in a common, fifth shifting device SE5 and can be actuated by means of a common, fifth shifting element actuating device SB5.

Furthermore, in FIG. 5 the transmission ratios of the individual wheel planes I, II, III, IV, V and VI and those of the planetary gear assemblies GP1, GP2 are shown. The first wheel plane I has a transmission ratio i1 of 1.12. The second wheel plane II has a transmission ratio i2 of 1.12.

The third wheel plane III has a transmission ratio i3 of 1.4. The fourth wheel plane IV has a transmission ratio i4 of 1.12. The sixth wheel plane VI has a transmission ratio 15 of −1.4.

The fifth wheel plane V has a transmission ratio 15 of 1.75. The first planetary gear assembly GP1 has a transmission ratio i07 of −1.45. The second planetary gear assembly GP2 has a transmission ratio i08 of −3.8.

FIG. 6 shows a shifting matrix for a transmission according to the third embodiment of the present invention.

FIG. 6 shows a shifting matrix for a transmission 1 according to FIG. 5. Unless expressly stated in what follows, the clutches K1, K2 and the shifting elements S11 S12, S21, S22, S31, S41, S42, S51 and S52 are open.

To obtain the first forward gear V1, the clutch K1 and the shifting elements S12, S41 and S51 are closed. To obtain the second forward gear V2, the second clutch K2 and the shifting elements S21, S41 and S51 are closed. To obtain the third forward gear V3, the first clutch K1 and the shifting elements S11, S41 and S51 are closed. To obtain the fourth forward gear V4, the clutch K2 and the shifting elements S31 and S51 are closed. To obtain the fifth forward gear V5, the clutch K1 and the shifting elements S12, S42 and S51 are closed. To obtain the sixth forward gear V6, the clutch K2 and the shifting elements S21, S42 and S51 are closed. To obtain the seventh forward gear V7, the clutch K1 and the shifting elements S11 S42 and S51 are closed. To obtain the eighth forward gear V8, the clutch K1 and the shifting elements S12, S41 and S52 are closed. To obtain the ninth forward gear V9, the second clutch K2 and the shifting elements S21, S41 and S52 are closed. To obtain the tenth forward gear V10, the clutch K1 and the shifting elements S11, S41 and S52 are closed, To obtain the eleventh forward gear V11, the clutch K2 and the shifting elements S31 and S52 are closed. To obtain the twelfth forward gear V12, the clutch K1 and the shifting elements S12, S42 and S52 are closed. To obtain the thirteenth forward gear V13, the clutch K2 and the shifting elements S21, S42 and S52 are closed. To obtain the fourteenth forward gear V14, the clutch K1 and the shifting elements S11, S42 and S52 are closed.

To obtain the first reverse gear R1, the clutch K2 and the shifting elements S22, S41 and S51 are closed. To obtain the second reverse gear R2, the clutch K2 and the shifting elements S22, S42 and S51 are closed.

The absolute transmission ratio i_ of the first forward gear V1 is 18.4, The absolute transmission ratio i_ of the second forward gear V2 is 14.8, and the relative transmission ratio phi between the first V1 and second V2 forward gears is 1.25.

The absolute transmission ratio i_ of the third forward gear V3 is 11.8 and the relative transmission ratio phi between the second V2 and third V3 forward gears is 1.25. The absolute transmission ratio i_ of the fourth forward gear V4 is 9.41 and the relative transmission ratio phi between the third V3 and fourth V4 forward gears is 1.25.

The absolute transmission ratio i_ of the fifth forward gear V5 is 7.53 and the relative transmission ratio phi between the fourth V4 and fifth V5 forward gears is 1.25. The absolute transmission ratio i_ of the sixth forward gear V6 is 6.02 and the relative transmission ratio phi between the fifth V5 and sixth V6 forward gears is 1.25.

The absolute transmission ratio i_ of the seventh forward gear V7 is 4.80 and the relative transmission ratio phi between the sixth V6 and seventh V7 forward gears is 1.25. The absolute transmission ratio i_ of the eighth forward gear V8 is 3.84 and the relative transmission ratio phi between the seventh V7 and eighth V8 forward gears is 1.25.

The absolute transmission ratio i_ of the ninth forward gear V9 is 3.07 and the relative transmission ratio phi between the eighth V8 and ninth V9 forward gears is 1.25. The absolute transmission ratio i_ of the tenth forward gear V10 is 2.45 and the relative transmission ratio phi between the ninth V9 and tenth V10 forward gears is 1.25.

The absolute transmission ratio i_ of the eleventh forward gear V11 is 1.96 and the relative transmission ratio phi between the tenth V10 and eleventh V11 forward gears is 1.25. The absolute transmission ratio i_ of the twelfth forward gear V12 is 1.57 and the relative transmission ratio phi between the eleventh V11 and twelfth V12 forward gears is 1.25.

The absolute transmission ratio i_ of the thirteenth forward gear V13 is −1.25 and the relative transmission ratio phi between the twelfth V12 and thirteenth V13 forward gears is 1.25. The absolute transmission ratio i_ of the fourteenth forward gear V14 is 1.00 and the relative transmission ratio phi between the thirteenth V13 and fourteenth V14 forward gears is 1.25.

The absolute transmission ratio i_ of the first reverse gear R1 is −18.4. The absolute transmission ratio i_ of the second reverse gear R2 is −7.53.

Figure 7:
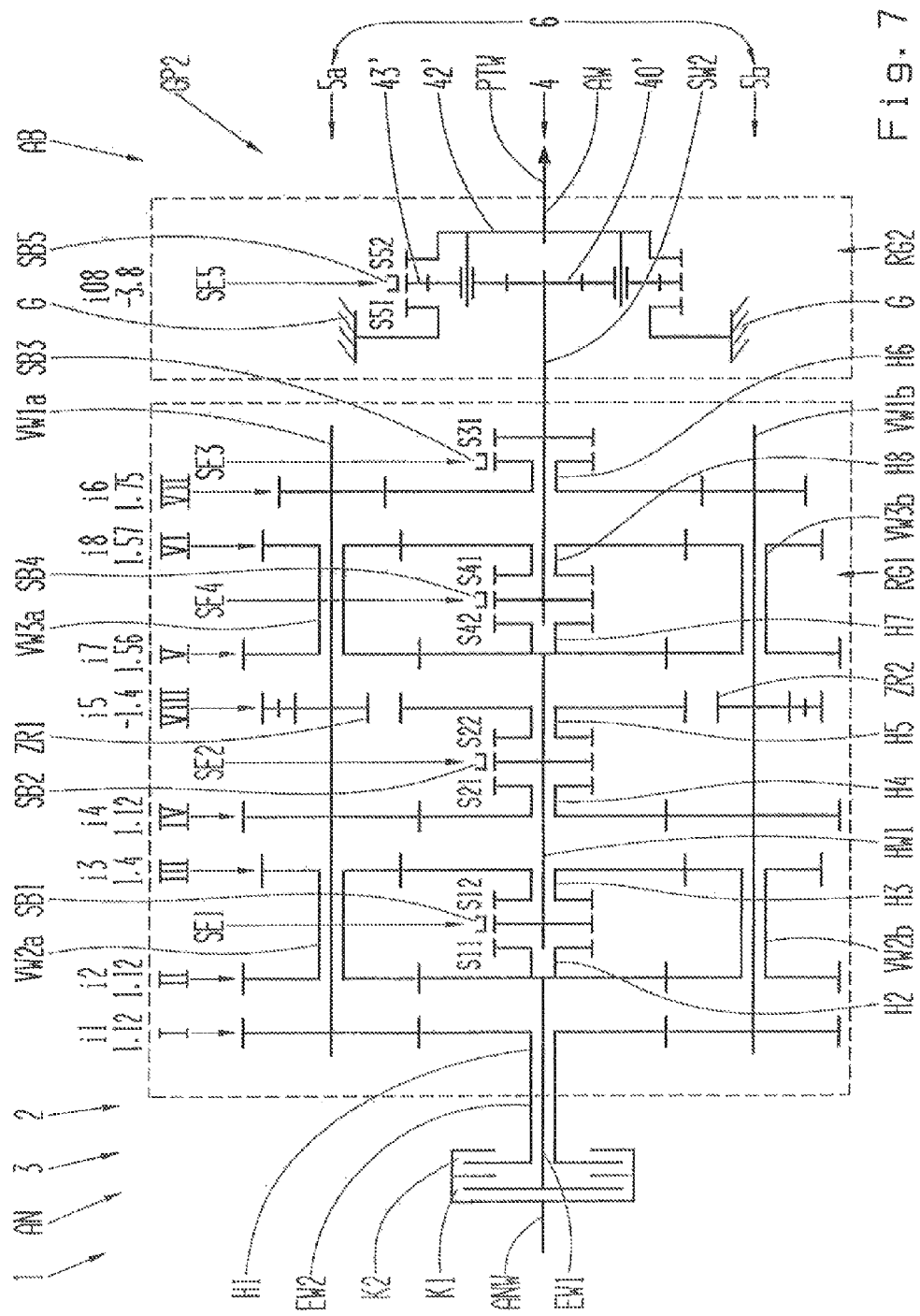
FIG. 7: A transmission according to a fourth embodiment of the present invention.

FIG. 7 shows a transmission according to a fourth embodiment of the present invention.

FIG. 7 shows a transmission substantially according to FIG. 5. The difference from the transmission 1 according to FIG. 5 is that the first range group RG1 is not a planetary gear assembly, but instead a countershaft assembly. Owing to this, two further wheel planes V and VI are additionally provided. The wheel planes I to III and VI and the first main shaft HW1 and the second sun shaft SW2 from FIG. 5 correspond to the wheel planes I to III and VIII and the first main shaft HW1 and the second sun shaft SW2 of FIG. 7. The second range group RG2 of FIG. 5 corresponds to the second range group RG2 of FIG. 7. The first main shaft HW1 is connected to the second sun shaft SW2 by means of the seventh shifting element S42.

The seventh wheel plane VII in FIG. 7 corresponds to the fifth wheel plane V of FIG. 5. The fifth shifting element S31 is arranged on the input shaft axis 4 and is connected, on the one hand, to a sixth hollow shaft H6 and, on the other hand, to the second sun shaft SW2, and when actuated, forms a connection for the transmission of force and torques between the sixth hollow shaft H6 and the second sun shaft SW2. The sixth hollow shaft H6 is arranged coaxially with and parallel to the second sun shaft SW2, radially on the outside thereof. Arranged on the sixth hollow shaft H6 there is a transmission element, which cooperates with respective transmission elements on the two countershafts VW3a, VW3b of the countershaft axes 5a, 5b to form the seventh wheel plane VII.

The seventh shifting element S42 is arranged on the input shaft axis 4 and is connected, on the one hand, to a seventh hollow shaft H7 and, on the other hand, to the second sun shaft SW2. The seventh hollow shaft H7 is arranged coaxially with the first main shaft HW1 and is functionally connected thereto. When actuated, the seventh shifting element S42 forms a force- and torque-transmitting connection between the seventh hollow shaft H7 and the second sun shaft SW2. A transmission element on the input shaft axis 4 is connected to both the seventh hollow shaft H7 and the first main shaft HW1, which element cooperates with respective transmission elements on the two countershafts VW3a, VW3b of the countershaft axes 5a, 5b to form the fifth wheel plane V. The countershafts VW3a, VW3b, which are in the form of hollow shafts, extend in the axial direction from the fifth wheel plane V to the sixth wheel plane VI.

The sixth shifting element S41 is arranged on the input shaft axis 4 and is connected, on the one hand, to an eighth hollow shaft H8 and, on the other hand, to the second sun shaft SW2, and when actuated, forms a force- and torques-transmitting connection between the eighth hollow shaft H8 and the second sun shaft SW2. The eighth hollow shaft H8 is arranged coaxially with and parallel to the second sun shaft SW2, radially on the outside thereof. On the eighth hollow shaft H8 there is arranged a transmission element, which cooperates with respective transmission elements on the two countershafts VW3a, VW3b of the countershaft axes 5a, 5b to form the sixth wheel plane VI.

Furthermore, FIG. 7 shows the transmission ratios of the individual wheel planes and the planetary gear assembly. The first wheel plane I has a transmission ratio i1 of 1.12. The second wheel plane II has a transmission ratio i2 of 1.12. The third wheel plane III has a transmission ratio i3 of 1.4. The fourth wheel plane IV has a transmission ratio i4 of 1.12. The eighth wheel plane VIII has a transmission ratio i5 of −1.4. The fifth wheel plane V has a transmission ratio i7 of 1.56. The sixth wheel plane VI has a transmission ratio i8 of 1.57. The seventh wheel plane VII has a transmission ratio i6 of 1.75. The planetary gear assembly GP2 has a transmission ratio i08 of −3.8.

A shifting matrix for a transmission 1 according to FIG. 7 corresponds to the shifting matrix shown in FIG. 6.

Figure 8:
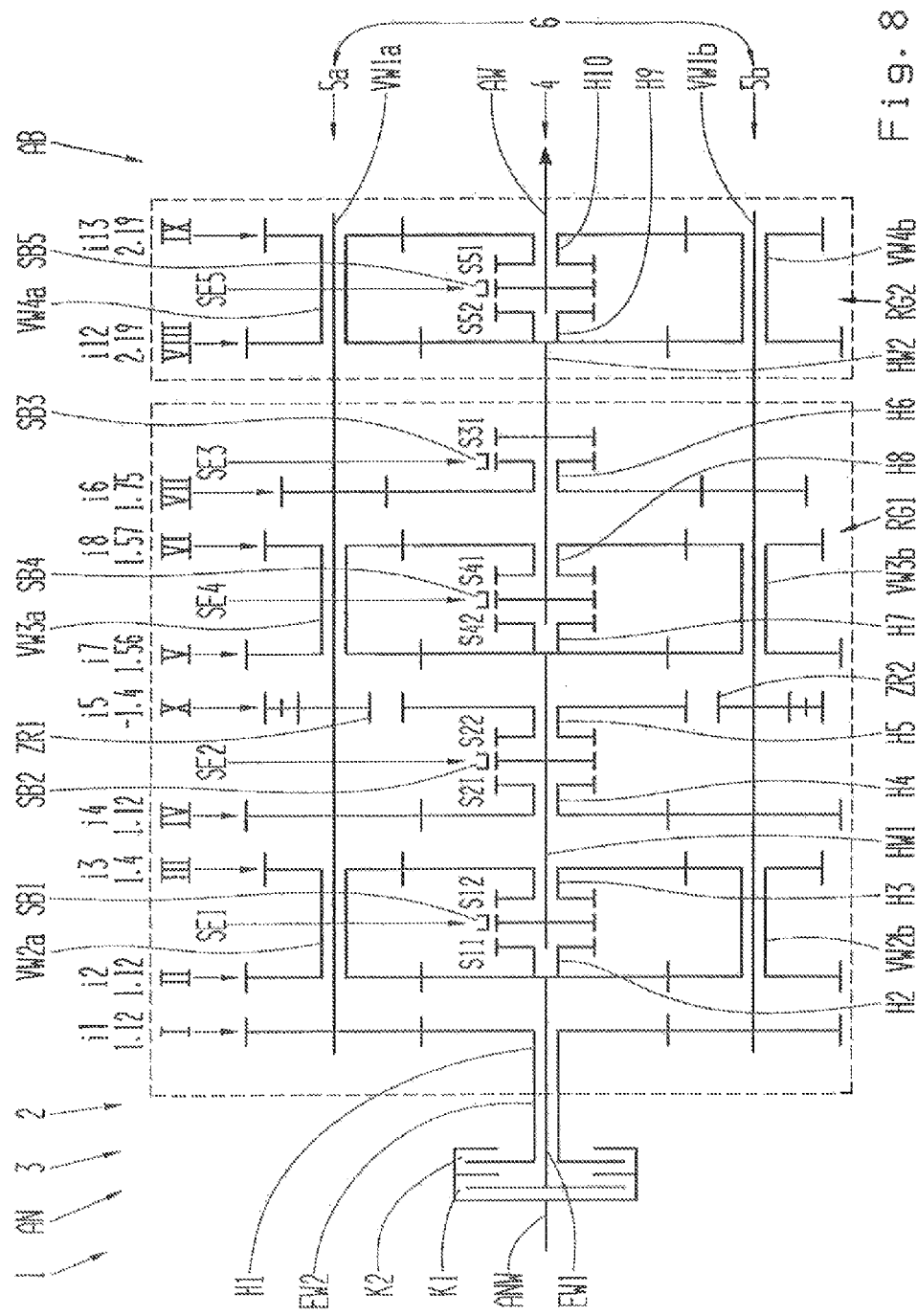
FIG. 8: A transmission according to a fifth embodiment of the present invention.

FIG. 8 shows a transmission according to a fifth embodiment of the present invention.

FIG. 8 shows a transmission substantially according to that of FIG. 7. The difference from the transmission 1 according to FIG. 7 is now that the second range group RG2 is made not as a planetary gear assembly, but as a countershaft assembly. Thereby, two further wheel planes VIII and IX are provided. The wheel planes I to IV and VI from FIG. 7 are identical in FIG. 8. The wheel plane VIII in FIG. 7 corresponds to the wheel plane X in FIG. 8. The first range group RG1 in FIG. 7 corresponds to the first range group RG1 in FIG. 8. The second main shaft HW2 is provided in place of the second sun shaft SW2 and is connected by means of the ninth shifting element S52 to the drive output shaft AW. The first main shaft HW1 is connected to the second main shaft HW2 by means of the seventh shifting element S42.

The ninth shifting element S52 is arranged on the input shaft axis 4 and connected, on the one hand, to a ninth hollow shaft H9 and, on the other hand, to the drive output shaft AW. The ninth hollow shaft H9 is arranged coaxially with the second main shaft HW2 and is functionally connected thereto. When actuated, the ninth shifting element S52 forms a force- and torque-transmitting connection between the ninth hollow shaft H9 and the drive output shaft AW. Both with the ninth hollow shaft H9 and with the second main shaft HW2, there is connected a transmission element on the input shaft axis 4, which cooperates with respective transmission elements on the two countershafts VW4a, VW4b of the countershaft axes 5a, 5b to form the eighth wheel plane VIII.

The eighth shifting element S51 is arranged on the input shaft axis 4 and is connected, on the one hand, to a tenth hollow shaft H10 and, on the other hand, to the drive output shaft AW, and when actuated, forms a force- and torque transmitting connection between the tenth hollow shaft H10 and the drive output shaft AW. The tenth hollow shaft H10 is arranged coaxially with and parallel to the drive output shaft AW, radially on the outside thereof. On the tenth hollow shaft H10 there is arranged a transmission element, which cooperates with respective transmission elements on the two countershafts VW4a, VW4b of the countershaft axes 5a, 5b to form the ninth wheel plane IX.

In addition, FIG. 8 shows the transmission ratios of the individual wheel planes. The first wheel plane I has a transmission ratio i1 of 1.12. The second wheel plane II has a transmission ratio i2 of 1.12.

The third wheel plane III has a transmission ratio i3 of 1.4, The fourth wheel plane IV has a transmission ratio i4 of 1.12. The tenth wheel plane X has a transmission ratio i5 of −1.4. The fifth wheel plane V has a transmission ratio i7 of 1.56. The sixth wheel plane VI has a transmission ratio i8 of 1.57. The seventh wheel plane VII has a transmission ratio i6 of 1.75. The eighth wheel plane VIII has a transmission ratio i12 of 2.19. The ninth wheel plane IX has a transmission ratio i13 of 2.19.

A shifting matrix for a transmission 1 according to FIG. 8 corresponds to the shifting matrix shown in FIG. 6.

Figure 9:
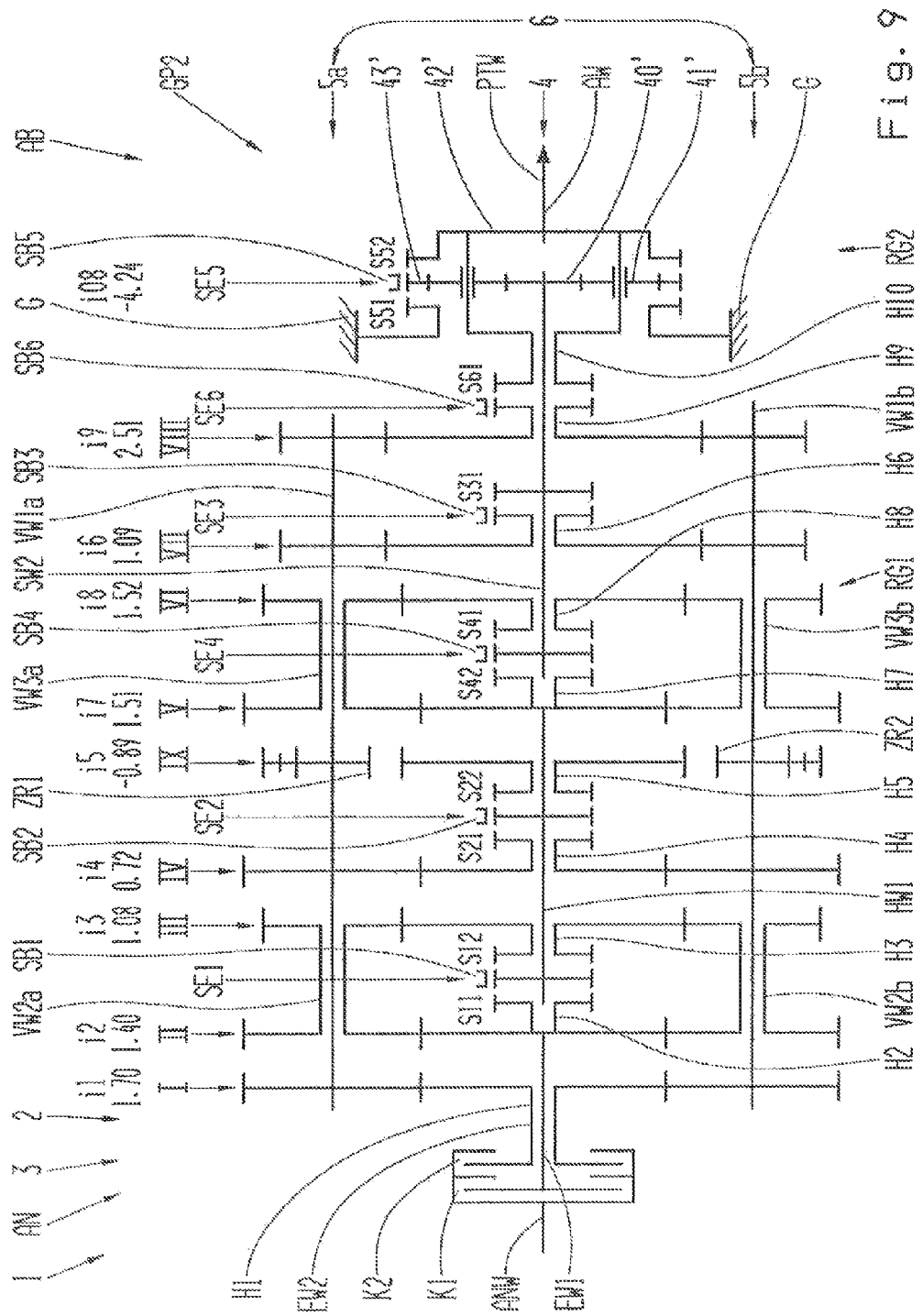
FIG. 9: transmission according to a sixth embodiment of the present invention.

FIG. 9 shows a transmission according to a sixth embodiment of the present invention.

FIG. 9 shows a transmission substantially according to FIG. 7. The difference from the transmission 1 according to FIG. 7 is that a tenth shifting element S61 is provided.

The wheel planes I to IV and V to VII in FIG. 7 are identical in FIG. 9. The wheel plane VIII in FIG. 7 corresponds to the wheel plane IX in FIG. 9.

The tenth shifting element S61 is arranged on the input shaft axis 4 and is connected, on the one hand, to a ninth hollow shaft H9 and, on the other hand, to a tenth hollow shaft H10, such that the tenth hollow shaft H10 is in the form of a planetary carrier shaft PTW and is thus connected to the planetary carrier 42' of the planetary gear assembly GP2. The ninth hollow shaft H9 and the tenth hollow shaft H10 are arranged coaxially with and parallel to the second sun shaft SW2. Thus, when actuated the tenth shifting element S61 forms a force- and torque-transmitting connection between the ninth H9 and tenth H10 hollow shafts. On the ninth hollow shaft H9 there is arranged a transmission element, which cooperates with respective transmission elements on the two countershafts VW1a, VW1b of the countershaft axes 5a, 5b to form the eighth wheel plane VIII.

Furthermore, FIG. 9 shows the transmission ratios of the individual wheel planes and of the planetary gear assembly. The first wheel plane I has a transmission ratio i1 of 1.70. The second wheel plane II has a transmission ratio i2 of 1.40.

The third wheel plane III has a transmission ratio i3 of 1.08. The fourth wheel plane IV has a transmission ratio i4 of 0.72. The ninth wheel plane IX has a transmission ratio i5 of −0.89.

The fifth wheel plane V has a transmission ratio i7 of 1.51. The sixth wheel plane VI has a transmission ratio i8 of 1.52. The seventh wheel plane VII has a transmission ratio i6 of 1.09.

The eight wheel plane VIII has a transmission ratio i9 of 2.51. The planetary gear assembly GP2 has a transmission ratio i08 of −4.24.

FIG. 10 shows a shifting matrix for a transmission according to the sixth embodiment of the present invention.

Unless otherwise stated below, all the clutches K1, K2 and all the shifting elements S11 S12, S21, S22, S31, S41, S42, S51, S52 and S61 are in each case open.

FIG. 10 shows a shifting matrix for a transmission 1 according to FIG. 9. To obtain the first forward gear V1 by means of the transmission 1 according to FIG. 9, the clutch K1 and the shifting elements S12, S41 and S51 are closed. To obtain the second forward gear V2 the clutch K2 and the shifting elements S21, S41 and S51 are closed.

To obtain the third forward gear V3 the clutch K1 and the shifting elements S11, S41 and S51 are closed. To obtain the fourth forward gear V4 the clutch K2 and the shifting elements S31 and S51 are closed.

To obtain the fifth forward gear V5 the clutch K1 and the shifting elements S12, S42 and S51 are closed. To obtain the sixth forward gear V6 the clutch K2 and the shifting elements S21, S42 and S51 are closed.

To obtain the seventh forward gear V7 the clutch K1 and the shifting elements S11, S42 and S51 are closed. To obtain the eighth forward gear V8 the clutch K2 and the shifting element S61 are closed.

To obtain the ninth forward gear V9 the clutch K1 and the shifting elements S12, S41 and S52 are closed. To obtain the tenth forward gear V10 the clutch K2 and the shifting elements S21, S41 and S52 are closed.

To obtain the eleventh forward gear V11 the clutch K1 and the shifting elements 811, S41 and S52 are closed. To obtain the twelfth forward gear V12 the clutch K2 and the shifting elements S31 and S52 are closed.

To obtain the thirteenth forward gear V13 the clutch K1 and the shifting elements S12, S42 and S52 are closed. To obtain the fourteenth forward gear V14 the clutch K2 and the shifting elements S21, S42 and S52 are closed.

To obtain the fifteenth forward gear V15 the clutch K1 and the shifting elements S11, S42 and S52 are closed.

To obtain the first reverse gear R1 the clutch K2 and the shifting elements S22, S41 and S51. are closed. To obtain the second reverse gear R2 the clutch K2 and the shifting elements S22, S42 and S51 are closed.

The absolute transmission ratio i_ of the first forward gear V1 is 18.1. The absolute transmission ratio i_ of the second forward gear V2 is 14.8, The absolute transmission ratio i_ of the third forward gear V3 is 12.0. The absolute transmission ratio i_ of the fourth forward gear V4 is 9.75. The absolute transmission ratio i_ of the fifth forward gear V5 is 7.93. The absolute transmission ratio i_ of the sixth forward gear V6 is 6.44. The absolute transmission ratio i_ of the seventh forward gear V7 is 5.24. The absolute transmission ratio i_ of the eighth forward gear V8 is 4.27. The absolute transmission ratio i_ of the ninth forward gear V9 is 3.46. The absolute transmission ratio i_ of the tenth forward gear V10 is 2.82. The absolute transmission ratio i_ of the eleventh forward gear V11 is 2.29. The absolute transmission ratio i_ of the twelfth forward gear V12 is 1.86. The absolute transmission ratio i_ of the thirteenth forward gear V13 is 1.51. The absolute transmission ratio i_ of the fourteenth forward gear V14 is 1.23. The absolute transmission ratio i_ of the fifteenth forward gear V15 is 1.0, The absolute transmission ratio i_ of the first reverse gear R1 is −18.2. The absolute transmission ratio i_ of the second reverse gear R2 is −7.93.

Figure 11:
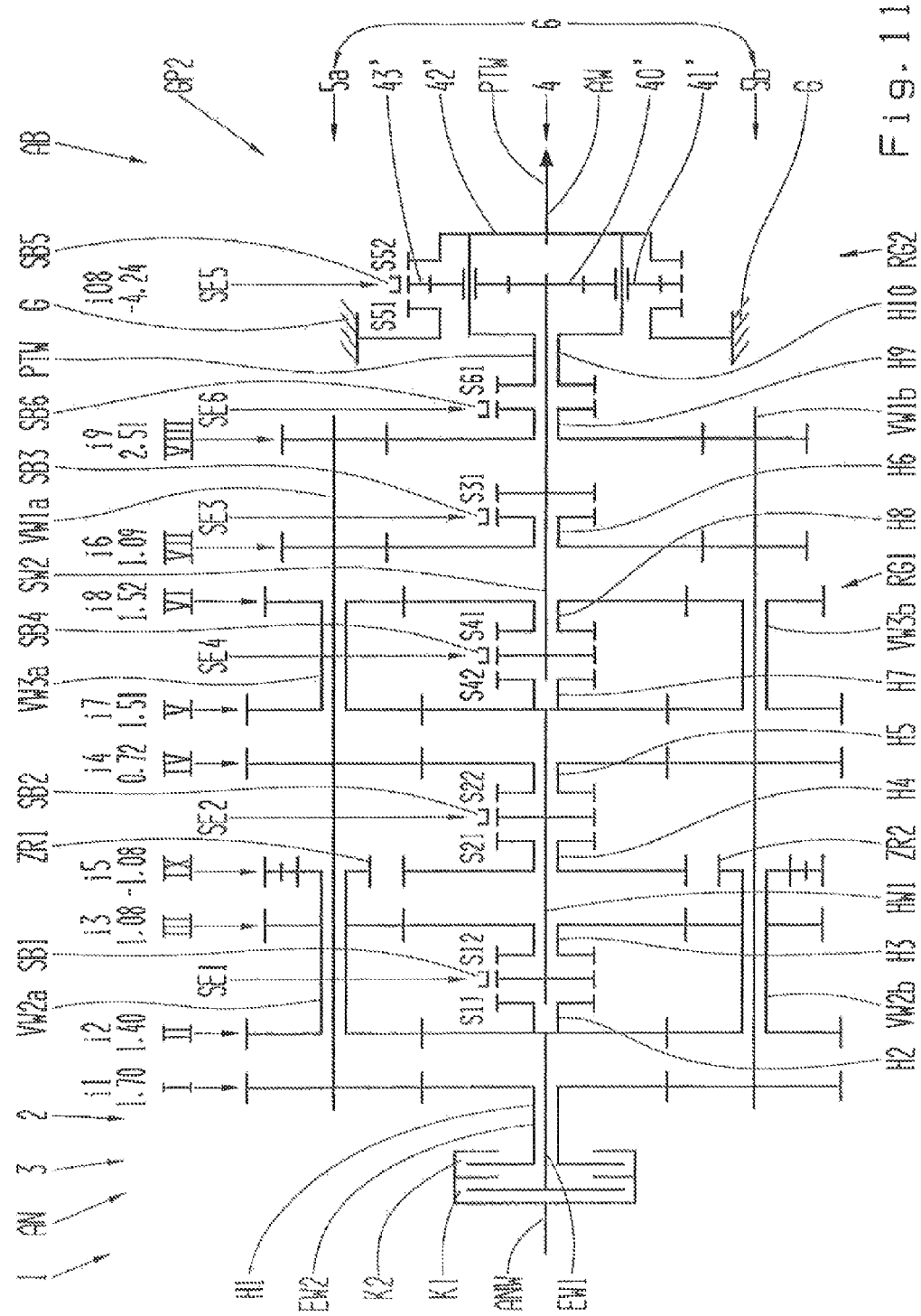
FIG. 11; A transmission according to a seventh embodiment of the present invention.

FIG. 11 shows a transmission according to a seventh embodiment of the present invention.

FIG. 11 shows a transmission substantially according to FIG. 9. In the transmission 1 according to FIG. 11 the difference from the transmission 1 according to FIG. 9 is that the reverse gear stage IX is arranged between the third wheel plane III and the fourth wheel plane IV. For this, on the fourth hollow shaft H4 there is arranged the corresponding transmission element, which cooperates with respective intermediate wheels ZR1, ZR2 between the input shaft axis 4 and in each case one of the two countershaft axes 5a, 5b and the corresponding transmission elements on the two countershafts VW2a, VW2b to form the ninth wheel plane IX in the form of the reverse gear stage. Furthermore, the countershafts VW2a, VW2b extend in the axial direction from the second wheel plane II, through the third wheel plane III and as far as the ninth wheel plane IX. The reverse gear stage can be engaged by means of the shifting element S21.

In addition, FIG. 11 shows the transmission ratios of the individual wheel planes and the planetary gear assembly. The first wheel plane I has a transmission ratio i1 of 1.70. The second wheel plane II has a transmission ratio i2 of 1.40. The third wheel plane III has a transmission ratio i3 of 1.08. The ninth wheel plane IX has a transmission ratio i5 of −1.08. The fourth wheel plane IV has a transmission ratio i4 of 0.72. The fifth wheel plane V has a transmission ratio i7 of 1.51. The sixth wheel plane VI has a transmission ratio i8 of 1.52. The seventh wheel plane VII has a transmission ratio i6 of 1.09, The eighth wheel plane VIII has a transmission ratio i9 of 2.51. The planetary gear assembly GP2 has a transmission ratio i08 of −4.24.

FIG. 12 shows a shifting matrix for a transmission according to the seventh embodiment of the present invention.

Unless otherwise stated below, all the clutches K1, K2 and all the shifting elements S11, S12, S21, S22, S31, S41, S42, S51, S52 and S61 are in each case open.

FIG. 12 shows a shifting matrix for a transmission 1 according to FIG. 11. To obtain the first forward gear V1 with the transmission 1 according to FIG. 11, the clutch K1 and the shifting elements S12, S41 and S51 are closed. To obtain the second forward gear V2, the clutch K2 and the shifting elements S22, S41 and S51 are closed.

To obtain the third forward gear V3, the clutch K1 and the shifting elements S11, S41 and S51 are closed. To obtain the fourth forward gear V4, the clutch K2 and the shifting elements S31 and S51 are closed.

To obtain the fifth forward gear V5, the clutch K1 and the shifting elements S12, S42 and S51 are closed. To obtain the sixth forward gear V6, the clutch K2 and the shifting elements S22, S42 and S51 are closed.

To obtain the seventh forward gear V7, the clutch K1 and the shifting elements S11, S42 and S51 are closed. To obtain the eighth forward gear V8, the clutch K2 and the shifting element S61 are closed.

To obtain the ninth forward gear V9, the clutch K1 and the shifting elements S12, S41 and S52 are closed. To obtain the tenth forward gear V10, the clutch K2 and the shifting elements S22, S41 and S52 are closed.

To obtain the eleventh forward gear V11, the clutch K1 and the shifting elements S11, S41 and S52 are closed. To obtain the twelfth forward gear V12, the clutch K2 and the shifting elements S31 and S52 are closed.

To obtain the thirteenth forward gear V13, the clutch K1 and the shifting elements S12, S42 and S52 are closed. To obtain the fourteenth forward gear V14, the clutch K2 and the shifting elements S22, S42 and S52 are closed.

To obtain the fifteenth forward gear V15, the clutch K1 and the shifting elements S11, S42 and S52 are closed.

To obtain the first reverse gear R1, the clutch K1 and the shifting elements S21, S41 and S51 are closed. To obtain the second reverse gear R2, the clutch K1 and the shifting elements S21, S42 and S51 are dosed.

The absolute transmission ratio i_ of the first forward gear V1 is 18.1. The absolute transmission ratio i_ of the second forward gear V2 is 14.8. The absolute transmission ratio i_ of the third forward gear V3 is 12.0. The absolute transmission ratio i_ of the fourth forward gear V4 is 9.75. The absolute transmission ratio i_ of the fifth forward gear V5 is 7.93. The absolute transmission ratio i_ of the sixth forward gear V6 is 6.44. The absolute transmission ratio i_ of the seventh forward gear V7 is 5.24. The absolute transmission ratio i_ of the eighth forward gear V8 is 4.27. The absolute transmission ratio i_ of the ninth forward gear V9 is 3.46. The absolute transmission ratio i_ of the tenth forward gear V10 is 2.82. The absolute transmission ratio i_ of the eleventh forward gear V11 is 2.29. The absolute transmission ratio i_ of the twelfth forward gear V12 is 1.86. The absolute transmission ratio i_ of the thirteenth forward gear V13 is 1.51. The absolute transmission ratio i_ of the fourteenth forward gear V14 is 1.23. The absolute transmission ratio i_ of the fifteenth forward gear V15 is 1.0. The absolute transmission ratio i_ of the first reverse gear R1 is −18.2. The absolute transmission ratio i_ of the second reverse gear R2 is −7.93.

Figure 13:
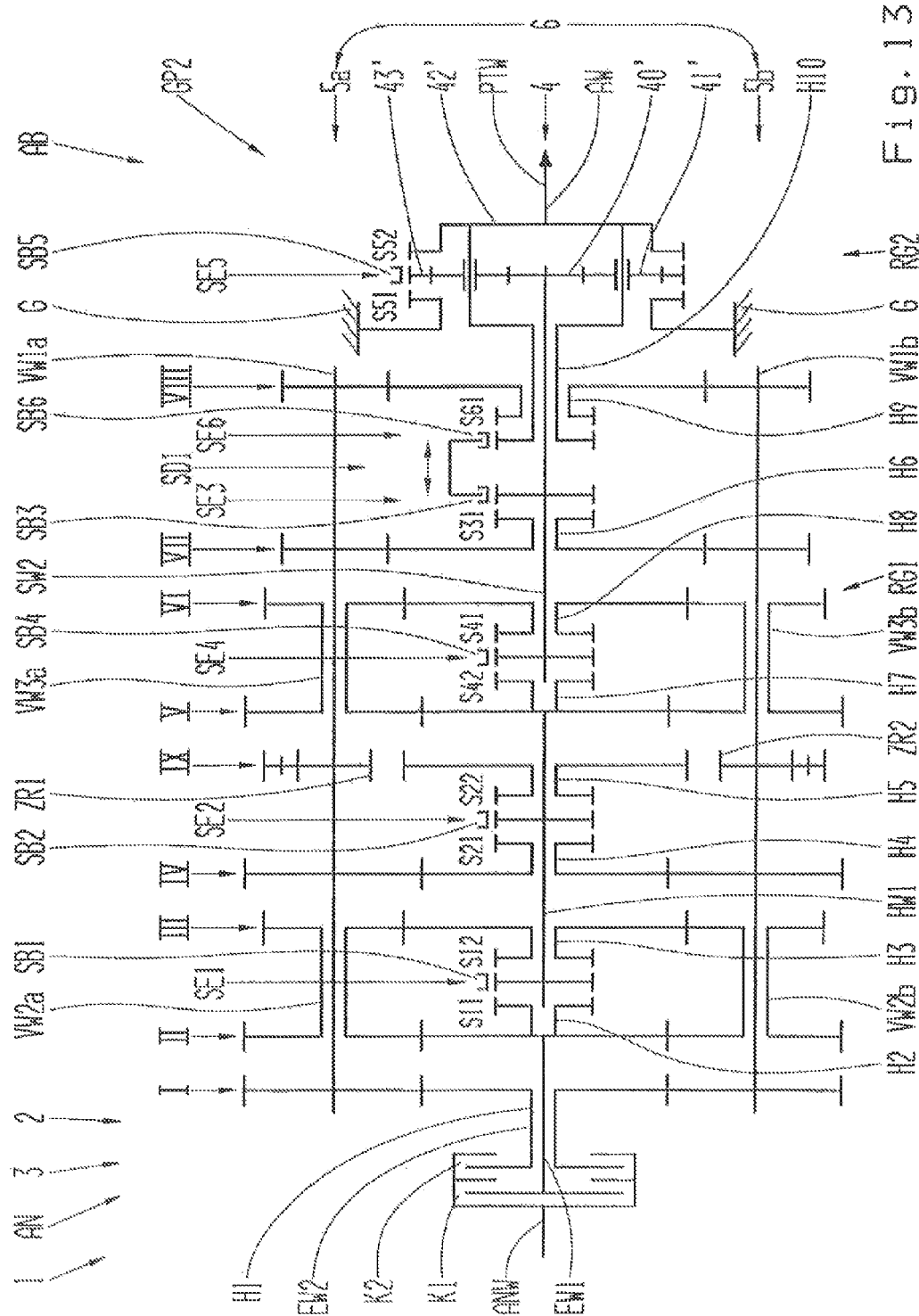
FIG. 13: A transmission according to a eighth embodiment of the present invention.

FIG. 13 shows a transmission according to an eighth embodiment of the present invention.

FIG. 13 shows a transmission substantially the same as that of FIG. 9. The difference from the transmission 1 according to FIG. 9 is that the third shifting device SE3 and the tenth shifting device SE6 are arranged in the form of a dual shifting element SD1. The wheel planes I to VII and the ninth wheel plane IX in FIGS. 9 and 13 are identical.

The fifth shifting element S31 is arranged on the input shaft axis 4 and is connected, on the one hand, to a sixth hollow shaft H6 and, on the other hand, to the second sun shaft SW2. The sixth hollow shaft H6 is arranged coaxially with and parallel to the second sun shaft SW2. Thus, when actuated the fifth shifting element S31 forms a force- and torque-transmitting connection between the sixth hollow shaft H6 and the second sun shaft SW2. On the sixth hollow shaft H6 there is arranged a transmission element, which cooperates with respective transmission elements on the two countershafts VW1a, VW1b of the countershaft axes 5a, 5b to form the seventh wheel plane VII.

The tenth shifting element S61 is arranged on the input shaft axis 4 and is connected, on the one hand, to a ninth hollow shaft H9 and, on the other hand, to a tenth hollow shaft H10. The ninth hollow shaft H9 is arranged coaxially with and parallel to the tenth hollow shaft H10, radially on the outside thereof, and thus also coaxially with the second sun shaft SW2, Thus, when actuated the tenth shifting element S61 forms a force- and torque-transmitting connection between the ninth hollow shaft H9 and the tenth hollow shaft H10. On the ninth hollow shaft H9 there is arranged a transmission element, which cooperates with respective transmission elements on the two countershafts VW1a, VW1b of the countershaft axes 5a, 5b to form the eighth wheel plane VIII.

The fifth shifting element S31 is accommodated in a third shifting device SE3 and can be actuated by means of a third shifting element actuating device SB3. The tenth shifting element S61 is accommodated in a sixth shifting device SE6 and can be actuated by means of a sixth shifting element actuating device SB6. The fifth shifting element S31 and the tenth shifting element S61 as well as the third shifting element actuating device SB3 and the sixth shifting element actuating device SB6 are combined in the first dual shifting element SD1.

A shifting matrix for a transmission according to FIG. 13 corresponds to the shifting matrix shown in FIG. 10.

Figure 14:
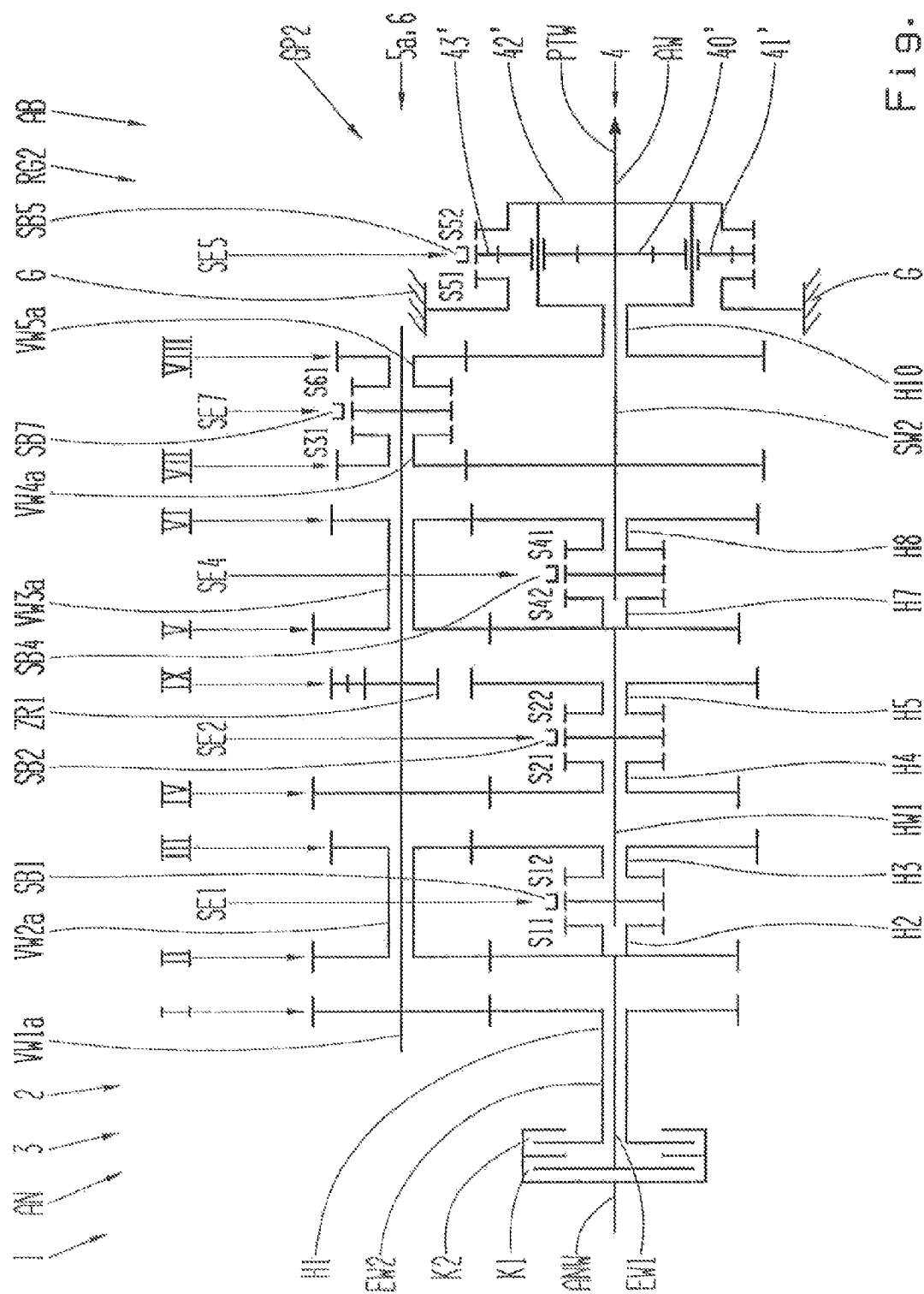
FIG. 14: A transmission according to a ninth embodiment of the present invention.

FIG. 14 shows a transmission according to a ninth embodiment of the present invention.

FIG. 14 shows a transmission 1 substantially the same as the transmission in FIG. 13. In contrast to FIG. 13, in FIG. 14 a countershaft assembly 6 with only one countershaft axis 5a is provided. Otherwise, the wheel planes I to VI and wheel plane IX are identical in FIGS. 13 and 14.

The fifth shifting element S31 is arranged on the countershaft axis 5a and is connected, on the one hand, to the countershaft VW4a and on the other hand to the countershaft VW1a, and when actuated, forms a force- and torque-transmitting connection between the countershafts VW4a and VW1a. The countershaft VW4a is arranged coaxially with and parallel to the countershaft VW1a. On the countershaft VW4a there is arranged a transmission element, which cooperates with a transmission element on the second sun shaft SW2 on the input shaft axis 4 to form the seventh wheel plane VII.

The tenth shifting element S61 is arranged on the countershaft axis 5a and is connected, on the one hand, to the countershaft VW5a and, on the other hand, to the countershaft VW1a, and when actuated, forms a force- and torque-transmitting connection between the countershafts VW5a and VW1a. The countershaft VW5a is arranged coaxially with and parallel to the countershaft VW1a, On the countershaft VW5a there is arranged a transmission element, which cooperates with a transmission element on the tenth hollow shaft H10 on the input shaft axis 4 to form the eighth wheel plane VIII. The tenth hollow shaft H10 is arranged coaxially with and parallel to the second sun shaft SW2 on the input shaft axis 4. The fifth shifting element S31 and the tenth shifting element S61 are combined in a seventh shifting device SE7 and can be actuated by means of a seventh shifting element actuating device SB7.

A shifting matrix for a transmission 1 according to FIG. 14 is shown in FIG. 10.

Figure 15:
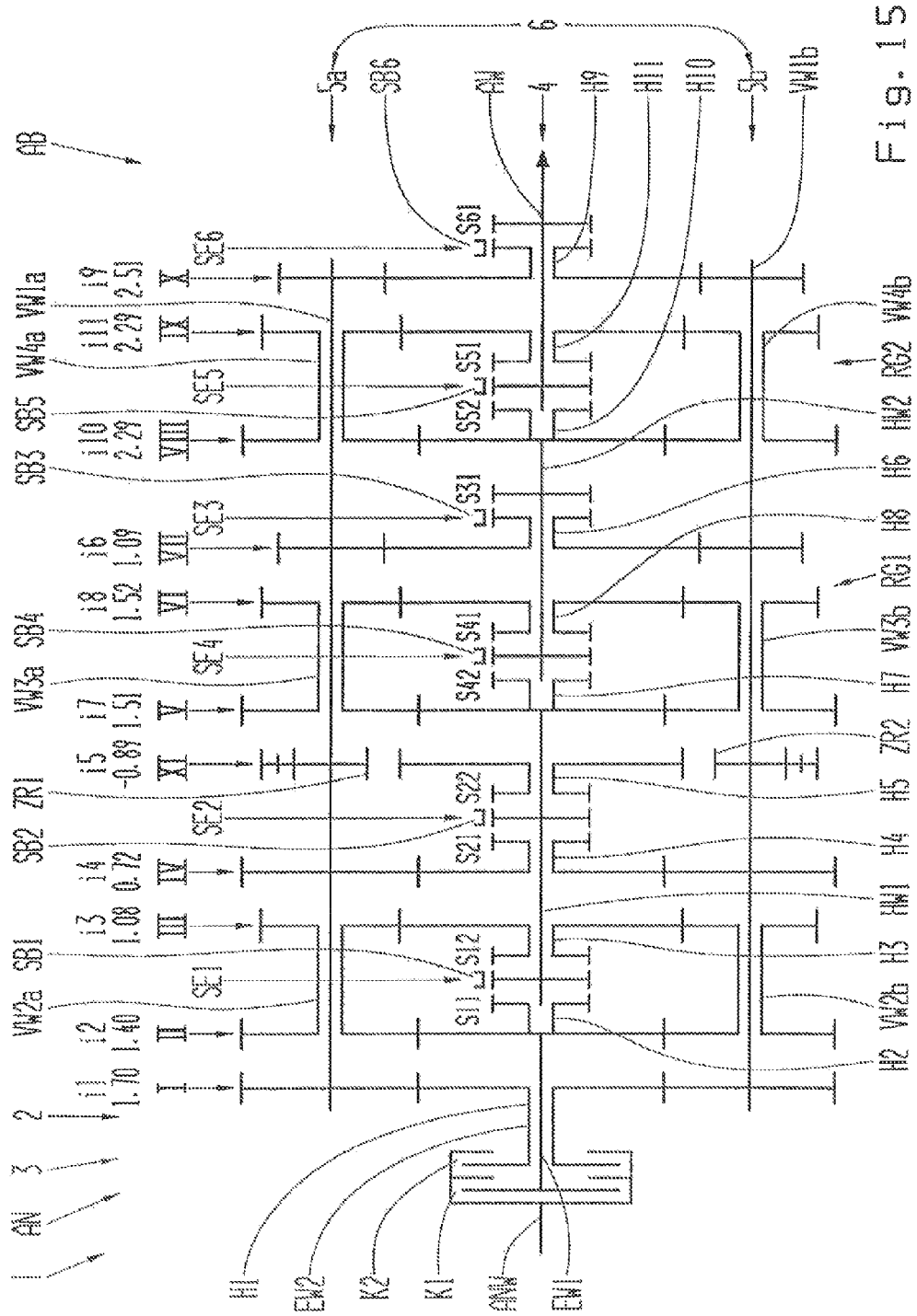
FIG. 15: A transmission according to a tenth embodiment of the present invention.

FIG. 15 shows a transmission according to a tenth embodiment of the present invention.

FIG. 15 shows a transmission 1 substantially the same as that of FIG. 9. The difference from the transmission 1 of FIG. 9 is that the second range group RG2 is in the form not of a planetary gear assembly, but of a countershaft assembly. Thereby, two further wheel planes VIII and IX are provided. The wheel planes I to IV and V to VII and the first main shaft HW1 in FIG. 9 are identical in FIG. 15. The wheel plane IX in FIG. 9 corresponds to the wheel plane XI in FIG. 15. The first range group RG1 in FIG. 9 corresponds to the first range group RG1 in FIG. 15. The second sun shaft SW2 in FIG. 9 is replaced by the second main shaft HW2. The second main shaft HW2 is connected to the drive output shaft AW by means of the ninth shifting element S52.

The ninth shifting element S52 is arranged on the input shaft axis 4 and is connected, on the one hand, to a tenth hollow shaft H10 and, on the other hand, to the drive output shaft AW. The tenth hollow shaft H10 is arranged coaxially with and parallel to the second main shaft HW2, and is functionally connected thereto. The ninth shifting element S52, when actuated, forms a force- and torque-transmitting connection between the tenth hollow shaft H10 and the drive output shaft AW. A transmission element on the input shaft axis 4 is connected both to the tenth hollow shaft H10 and to the second main shaft HW2, which element cooperates with respective transmission elements on the two countershafts VW4a, VW4b of the countershaft axes 5a, 5b to form the eighth wheel plane VIII. The countershafts VW4a, VW4b, which are in the form of hollow shafts, extend in the axial direction from the eighth wheel plane VIII as far as the ninth wheel plane IX.

The eighth shifting element S51 is arranged on the input shaft axis 4 and is connected, on the one hand, to an eleventh hollow shaft H11 and, on the other hand, to the drive output shaft AW, and when actuated, forms a force- and torque-transmitting connection between the eleventh hollow shaft H11 and the drive output shaft AW. The eleventh hollow shaft H11 is arranged coaxially with and parallel to the drive output shaft AW, radially on the outside thereof. On the eleventh hollow shaft H11 there is arranged a transmission element, which cooperates with respective transmission elements on the two countershafts VW4a, VW4b of the countershaft axes 5a, 5b to form the ninth wheel plane IX.

The tenth shifting element S61 is arranged on the input shaft axis 4 and is connected, on the one hand, to a ninth hollow shaft H9 and, on the other hand, to the drive output shaft AW, and when actuated, forms a force- and torque-transmitting connection between the ninth hollow shaft H9 and the drive output shaft AW. The ninth hollow shaft H9 is arranged coaxially with and parallel to the drive output shaft AW, radially on the outside thereof. On the ninth hollow shaft H9 there is arranged a transmission element, which cooperates with respective transmission elements on the two countershafts VW1a, VW1b of the countershaft axes 5a, 5b to form the tenth wheel plane X.

In addition, FIG. 15 shows the transmission ratios of the individual wheel planes. The first wheel plane I has a transmission ratio i1 of 1.70. The second wheel plane II has a transmission ratio i2 of 1.40. The third wheel plane III has a transmission ratio i3 of 1.08. The fourth wheel plane IV has a transmission ratio i4 of 0.72. The eleventh wheel plane XI has a transmission ratio i5 of −0.89. The fifth wheel plane V has a transmission ratio i7 of 1.51. The sixth wheel plane VI has a transmission ratio i8 of 1.52. The seventh wheel plane VII has a transmission ratio i6 of 1.09. The eighth wheel plane VIII has a transmission ratio i10 of 2.29. The ninth wheel plane IX has a transmission ratio i11 of 2.29. The tenth wheel plane X has a transmission ratio i9 of 2.51.

A shifting matrix for a transmission 1 according to FIG. 15 corresponds to the shifting matrix according to FIG. 10.

Figure 16:
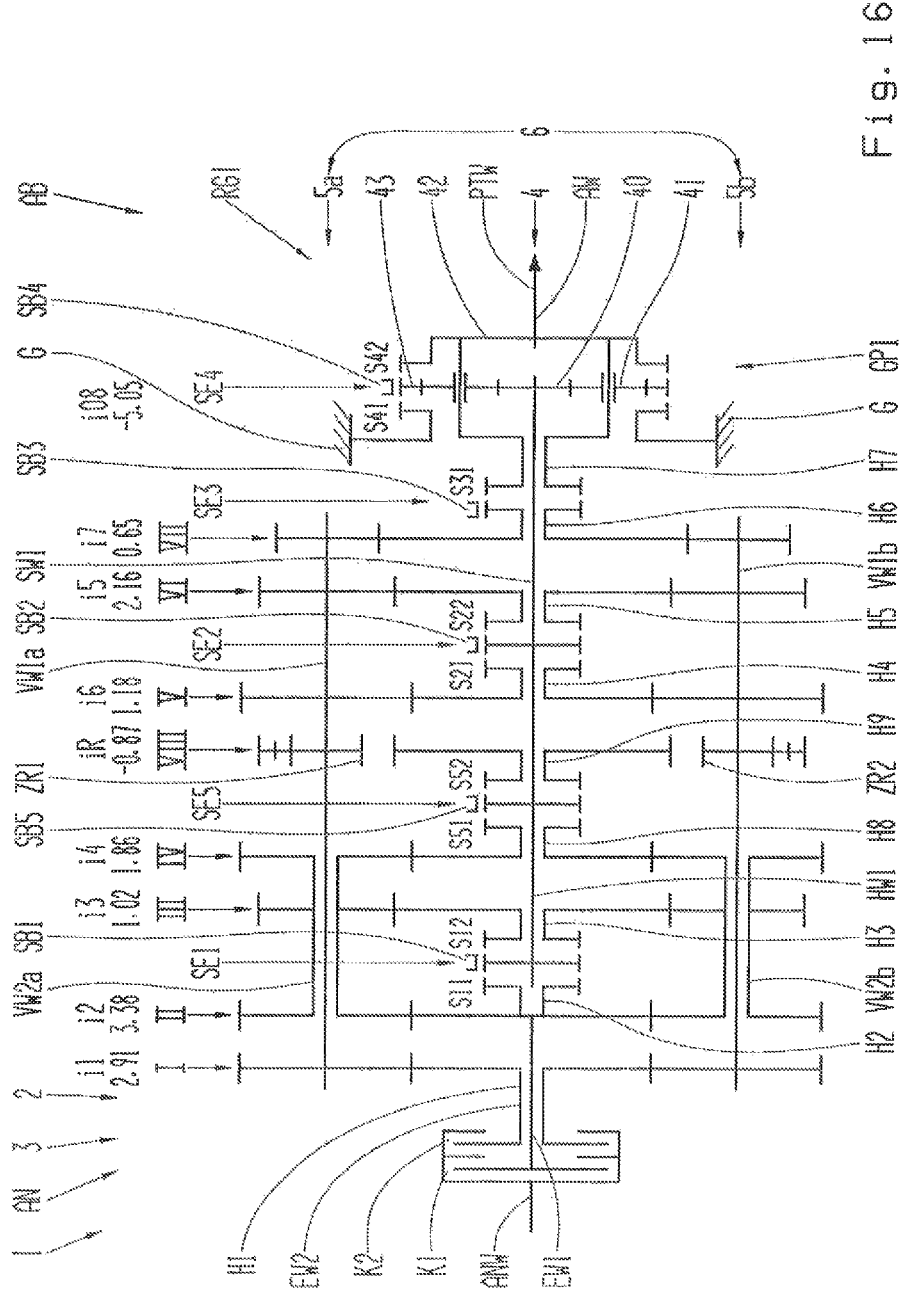
FIG. 16: A transmission according to a eleventh embodiment of the present invention.

FIG. 16 shows a transmission according to an eleventh embodiment of the present invention.

FIG. 16 shows a transmission 1 substantially the same as that of FIG. 1. The difference from the transmission 1 according to FIG. 1 is that two further wheel planes IV and VIII as well as a fifth shifting device SE5 are additionally provided. The wheel planes I to III in FIG. 1 are identical in FIG. 16. The wheel planes IV and V in FIG. 1 correspond to the wheel planes V and VII in FIG. 16. The first range group RG1 in FIG. 1 corresponds to the first range group RG1 in FIG. 16.

The eighth shifting element S51 is arranged on the input shaft axis 4 and is connected, on the one hand, to an eighth hollow shaft H8 and, on the other hand, to the first main shaft HW1. The eighth hollow shaft H8 is arranged coaxially with the first main shaft HW1. When actuated, the eighth shifting element S51 forms a force- and torque-transmitting connection between the eighth hollow shaft H8 and the first main shaft HW1. Connected to the eighth hollow shaft H8 there is a transmission element on the input shaft axis 4, which cooperates with respective transmission elements on the two countershafts VW2a, VW2b of the countershaft axes 5a, 5b to form the fourth wheel plane IV.

The ninth shifting element S52 is arranged on the input shaft axis 4 and is connected, on the one hand, to a ninth hollow shaft H9 and, on the other hand, to the first main shaft HW1. The ninth hollow shaft H9 is arranged coaxially with the first main shaft HW1. When actuated, the ninth shifting element S52 forms a force- and torque-transmitting connection between the ninth hollow shaft H9 and the first main shaft HW1. On the ninth hollow shaft H9 there is arranged a transmission element, which cooperates with respective intermediate wheels ZR1, ZR2 between the input shaft axis 4 and respectively one of the two countershaft axes 5a, 5b, and with the corresponding transmission elements on the two countershafts VW1a, VW1b, to form the eighth wheel plane VIII in the form of the reverse gear stage.

The eighth and ninth shifting elements S51, S52 are arranged combined in a fifth shifting device SE5 and can be actuated by means of a common, fifth shifting element actuating device SB5.

The fourth shifting element S22 is arranged on the input shaft axis 4 and is connected, on the one hand, to the fifth hollow shaft H5 and, on the other hand, to the first main shaft HW1. The fifth hollow shaft H5 is arranged coaxially with the first main shaft HW1. When actuated, the fourth shifting element S22 forms a force- and torque-transmitting connection between the fifth hollow shaft H5 and the first main shaft HW1. To the fifth hollow shaft H5 there is a transmission element on the input shaft axis 4, which cooperates with respective transmission elements on the two countershafts VW1a, VW1b of the countershaft axes 5a, 5b to form the sixth wheel plane VI.

Furthermore, FIG. 16 shows the transmission ratios of the individual wheel planes I, II, III, IV, V, VI, VII and VIII, as well as that of the planetary gear assembly GP1. The first wheel plane I has a transmission ratio i1 of 2.91, The second wheel plane II has a transmission ratio i2 of 3.38. The third wheel plane III has a transmission ratio i3 of 1.02, The fourth wheel plane IV has a transmission ratio i4 of 1.86. The eighth wheel plane VIII has a transmission ratio iR of −0.87. The fifth wheel plane V has a transmission ratio i6 of 1.18, The sixth wheel plane VI has a transmission ratio i5 of 2.16. The seventh wheel plane VII has a transmission ratio i7 of 0.65, The planetary gear assembly GP1 has a transmission ratio i08 of −5.05.

FIG. 17 shows a shifting matrix for a transmission according to the eleventh embodiment of the present invention.

Unless otherwise stated below, all the clutches K1, K2 and all the shifting elements S11, S12, S21, S22, S31, S41, S42, S51 and S52 are in each case open.

FIG. 17 shows a shifting matrix for a transmission 1 according to FIG. 16. To obtain the first forward gear V1 with the transmission 1 of FIG. 16, the clutch K1 and the shifting elements S12 and S41 are closed. To obtain the second forward gear V2, the clutch K2 and the shifting elements S21 and S41 are closed.

To obtain the third forward gear V3, the clutch K1 and the shifting elements S41 and S51 are closed. To obtain the fourth forward gear V4, the clutch K2 and the shifting elements S22 and S41 are closed.

To obtain the fifth forward gear V5, the clutch K1 and the shifting elements S11 and S41 are closed. To obtain the sixth forward gear V6, the clutch K2 and the shifting element S31 are closed.

To obtain the seventh forward gear V7, the clutch K1 and the shifting elements S12 and S42 are closed. To obtain the eighth forward gear V8, the clutch K2 and the shifting elements S21 and S42 are closed.

To obtain the ninth forward gear V9, the clutch K1 and the shifting elements S42 and S51 are closed. To obtain the tenth forward gear V10, the clutch K2 and the shifting elements S22 and S42 are closed.

To obtain the eleventh forward gear V11, the clutch K1 and the shifting elements S11 and S42 are closed.

To obtain the first reverse gear R1, the clutch K2 and the shifting element S52 are closed. To obtain the second reverse gear R2, the clutch K2 and the shifting element S52 are closed.

The absolute transmission ratio i_ of the first forward gear V1 is 20.1. The absolute transmission ratio i_ of the second forward gear V2 is 14.9 and the relative transmission ratio phi between the first and the second forward gears V1, V2 is 1.35.

The absolute transmission ratio i_ of the third forward gear V3 is 11.0 and the relative transmission ratio phi between the second and the third forward gears V2, V3 is 1.35. The absolute transmission ratio i_ of the fourth forward gear V4 is 8.17 and the relative transmission ratio phi between the third and the fourth forward gears V3, V4 is 1.35.

The absolute transmission ratio i_ of the fifth forward gear V5 is 6.05 and the relative transmission ratio phi between the fourth and the fifth forward gears V4, V5 is 1.35. The absolute transmission ratio i_ of the sixth forward gear V6 is 4.48 and the relative transmission ratio phi between the fifth and the sixth forward gears V5, V6 is 1.35.

The absolute transmission ratio i_ of the seventh forward gear V7 is 3.32 and the relative transmission ratio phi between the sixth and the seventh forward gears V6, V7 is 1.35. The absolute transmission ratio i_ of the eighth forward gear V8 is 2.46 and the relative transmission ratio phi between the seventh and the eighth forward gears V7, V8 is 1.35.

The absolute transmission ratio i_ of the ninth forward gear V9 is 1.82 and the relative transmission ratio phi between the eighth and the ninth forward gears V8, V9 is 1.35. The absolute transmission ratio i_ of the tenth forward gear V10 is 1.35 and the relative transmission ratio phi between the ninth and the tenth forward gears V9, V10 is 1.35.

The absolute transmission ratio i_ of the eleventh forward gear V11 is 1.00 and the relative transmission ratio phi between the tenth and the eleventh forward gears V10, V11 is 1.35.

The absolute transmission ratio i_ of the first reverse gear R1 is −20.2. The absolute transmission ratio i_ of the second reverse gear R2 is −3.34.

Figure 18:
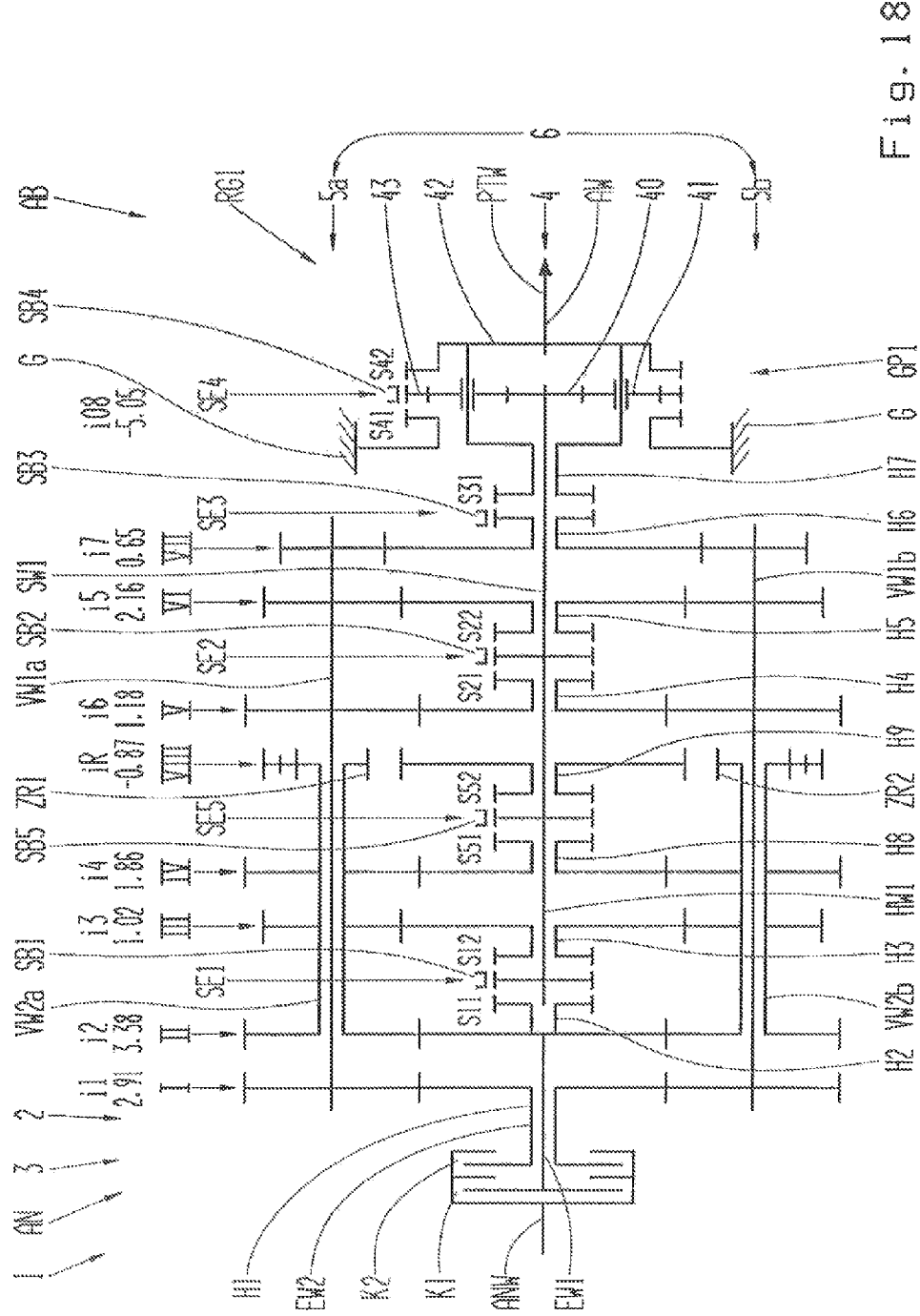
FIG. 18: A transmission according to a twelfth embodiment of the present invention.

FIG. 18 shows a transmission according to a twelfth embodiment of the present invention.

FIG. 18 shows a transmission substantially like that of FIG. 16. The difference from the transmission 1 according to FIG. 16 is that in the transmission 1 according to FIG. 18 the reverse gear stage VIII is associated with the first partial transmission 2. For this, the countershaft axes 5a, 5b extend from the second wheel plane II, through the third wheel plane III and the fourth wheel plane IV, as far as the eighth wheel plane VIII. Furthermore, on the ninth hollow shaft H9 there is arranged a transmission element which cooperates with respective intermediate wheels ZR1. ZR2 between the input shaft axis 4 and, respectively, one of the two countershaft axes 5a, 5b and with the corresponding transmission elements on the countershafts VW2a, VW2b, to form the eighth wheel plane VIII in the form of the reverse gear stage. The reverse gear stage VIII can be engaged or actuated by means of the ninth shifting element S52.

Furthermore, FIG. 18 shows the transmission ratios of the individual wheel planes I, II, III, IV, V, VI, VII and VIII, as well as that of the planetary gear assembly GP1. The first wheel plane I has a transmission ratio i1 of 2.91. The second wheel plane II has a transmission ratio i2 of 3.38. The third wheel plane III has a transmission ratio i3 of 1.02. The fourth wheel plane IV has a transmission ratio i4 of 1.86. The eighth wheel plane VIII has a transmission ratio iR of −0.87. The fifth wheel plane V has a transmission ratio i6 of 1.18. The sixth wheel plane VI has a transmission ratio i5 of 2.16. The seventh wheel plane VII has a transmission ratio i7 of 0.65. The planetary gear assembly GP1 has a transmission ratio i08 of −5.05.

FIG. 19 shows a shifting matrix for a transmission according to the twelfth embodiment of the present invention.

Unless otherwise stated below, all the clutches K1, K2 and all the shifting elements S11, S12, S21, S22, S31, S41, S42, S51 and S52 are in each case open.

FIG. 19 shows a shifting matrix for a transmission 1 according to FIG. 18. The forward gears V1 to V11 are obtained in the same way as in FIG. 17, so that to avoid repetition reference should be made to the description relating to FIG. 17.

To obtain the first reverse gear R1, the clutch K1 and the shifting element S52 are closed. To obtain the second reverse gear R2, the clutch K1 and the shifting element S52 are closed.

The absolute transmission ratio i_ of the first forward gear V1 is 20.1, The absolute transmission ratio i_ of the second forward gear V2 is 14.9 and the relative transmission ratio phi between the first and the second forward gears V1, V2 is 1.35.

The absolute transmission ratio i_ of the third forward gear V3 is 11.0 and the relative transmission ratio phi between the second and the third forward gears V2, V3 is 1.35. The absolute transmission ratio i_ of the fourth forward gear V4 is 8.17 and the relative transmission ratio phi between the third and the fourth forward gears V3, V4 is 1.35.

The absolute transmission ratio i_ of the fifth forward gear V5 is 6.05 and the relative transmission ratio phi between the fourth and the fifth forward gears V4, V5 is 1.35. The absolute transmission ratio i_ of the sixth forward gear V6 is 4.48 and the relative transmission ratio phi between the fifth and the sixth forward gears V5, V6 is 1.35.

The absolute transmission ratio i_ of the seventh forward gear V7 is 3.32 and the relative transmission ratio phi between the sixth and the seventh forward gears V6, V7 is 1.35. The absolute transmission ratio i_ of the eighth forward gear V8 is 2.46 and the relative transmission ratio phi between the seventh and the eighth forward gears V7, V8 is 1.35.

The absolute transmission ratio i_ of the ninth forward gear V9 is 1.82 and the relative transmission ratio phi between the eighth and the ninth forward gears V8, V9 is 1.35. The absolute transmission ratio i_ of the tenth forward gear V10 is 1.35 and the relative transmission ratio phi between the ninth and the tenth forward gears V9, V10 is 1.35.

The absolute transmission ratio i_ of the eleventh forward gear V11 is 1.00 and the relative transmission ratio phi between the tenth and the eleventh forward gears V10, V11 is 1.35.

The absolute transmission ratio i_ of the first reverse gear R1 is −20.2. The absolute transmission ratio i_ of the second reverse gear R2 is −3.34.

Figure 20:
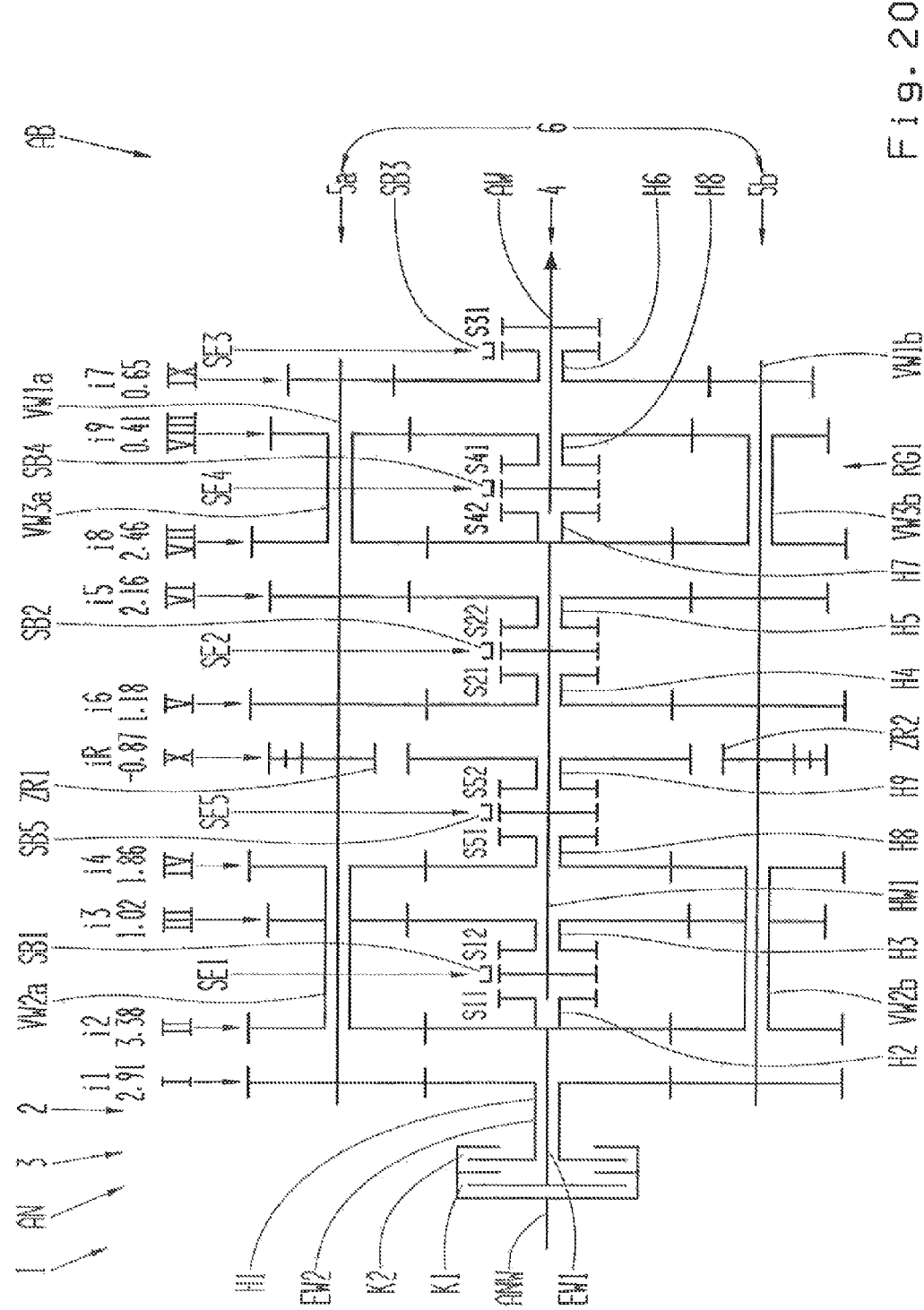
FIG. 20: A transmission according to a thirteenth embodiment of the present invention.

FIG. 20 shows a transmission according to a thirteenth embodiment of the present invention.

FIG. 20 shows a transmission 1 substantially the same as that of FIG. 16. The difference from the transmission 1 of FIG. 16 is that the first range group RG1 is made not as a planetary gear assembly, but as a countershaft assembly. In this way two further wheel planes VII and VIII are additionally provided. The wheel planes I to IV and VIII in FIG. 16 correspond to the wheel planes I to IV and X in FIG. 20. The first main shaft HW1 is connected to the drive output shaft AW by means of the seventh shifting element S42. The ninth wheel plane IX in FIG. 20 corresponds to the seventh wheel plane VII in FIG. 16.

The fifth shifting element S31 is arranged on the input shaft axis 4 and is connected, on the one hand, to a sixth hollow shaft H6 and, on the other hand, to the drive output shaft AW, and when actuated, forms a force- and torque-transmitting connection between the sixth hollow shaft H6 and the drive output shaft AW. The sixth hollow shaft H6 is arranged coaxially with and parallel to the drive output shaft, radially on the outside thereof. With the sixth hollow shaft H6 is connected a transmission element on the input shaft axis 4, which cooperates with respective transmission elements on the two countershafts VW1a, VW1b of the countershaft axes 5a, 5b to form the ninth wheel plane IX. The fifth shifting element S31 is arranged in a third shifting device SE3 and can be actuated by means of a third shifting element actuating device SB3.

The seventh shifting element S42 is arranged on the input shaft axis 4 and is connected, on the one hand, to a seventh hollow shaft H7 and, on the other hand, to the drive output shaft AW. The seventh hollow shaft H7 is arranged coaxially with the first main shaft HW1 and is functionally connected thereto. When actuated, the seventh shifting element S42 forms a force- and torque-transmitting connection between the seventh hollow shaft H7 and the drive output shaft AW. Both with the seventh hollow shaft H7 and also with the drive output shaft AW, there is connected a transmission element on the input shaft axis 4, which cooperates with respective transmission elements on the two countershafts VW3a, VW3b of the countershaft axes 5a, 5b to form the seventh wheel plane VII. The countershafts VW3a, VW3b, which are in the form of hollow shafts, extend in the axial direction from the seventh wheel plane VII as far as the eighth wheel plane VIII.

The sixth shifting element S41 is arranged on the input shaft axis 4 and is connected, on the one hand, to an eighth hollow shaft H8 and, on the other hand, to the drive output shaft AW, and when actuated, forms a force- and torque-transmitting connection between the eighth hollow shaft H8 and the drive output shaft AW. The eighth hollow shaft H8 is arranged coaxially with and parallel to the drive output shaft AW, radially on the outside thereof. On the eighth hollow shaft H8 there is arranged a transmission element, which cooperates with respective transmission elements on the two countershafts VW3a, VW3b of the countershaft axes 5a, 5b to form the eighth wheel plane VIII.

The sixth shifting element S41 and the seventh shifting element S42 are combined in a fourth shifting device SE4 and can be actuated by means of a common, fourth shifting element actuating device SB4.

Furthermore, FIG. 20 shows the transmission ratios of the individual wheel planes. The first wheel plane I has a transmission ratio i1 of 2.91. The second wheel plane II has a transmission ratio i2 of 3.38. The third wheel plane III has a transmission ratio i3 of 1.02. The fourth wheel plane IV has a transmission ratio i4 of 1.86. The tenth wheel plane X has a transmission ratio iR of −0.87. The fifth wheel plane V has a transmission ratio i6 of 1.18. The sixth wheel plane VI has a transmission ratio i5 of 2.16. The seventh wheel plane VII has a transmission ratio i8 of 2.46. The eighth wheel plane VIII has a transmission ratio i9 of 0.41. The ninth wheel plane IX has a transmission ratio i7 of 0.65.

A shifting matrix for a transmission 1 according to FIG. 20 corresponds to the shifting matrix in FIG. 17.

Figure 21:
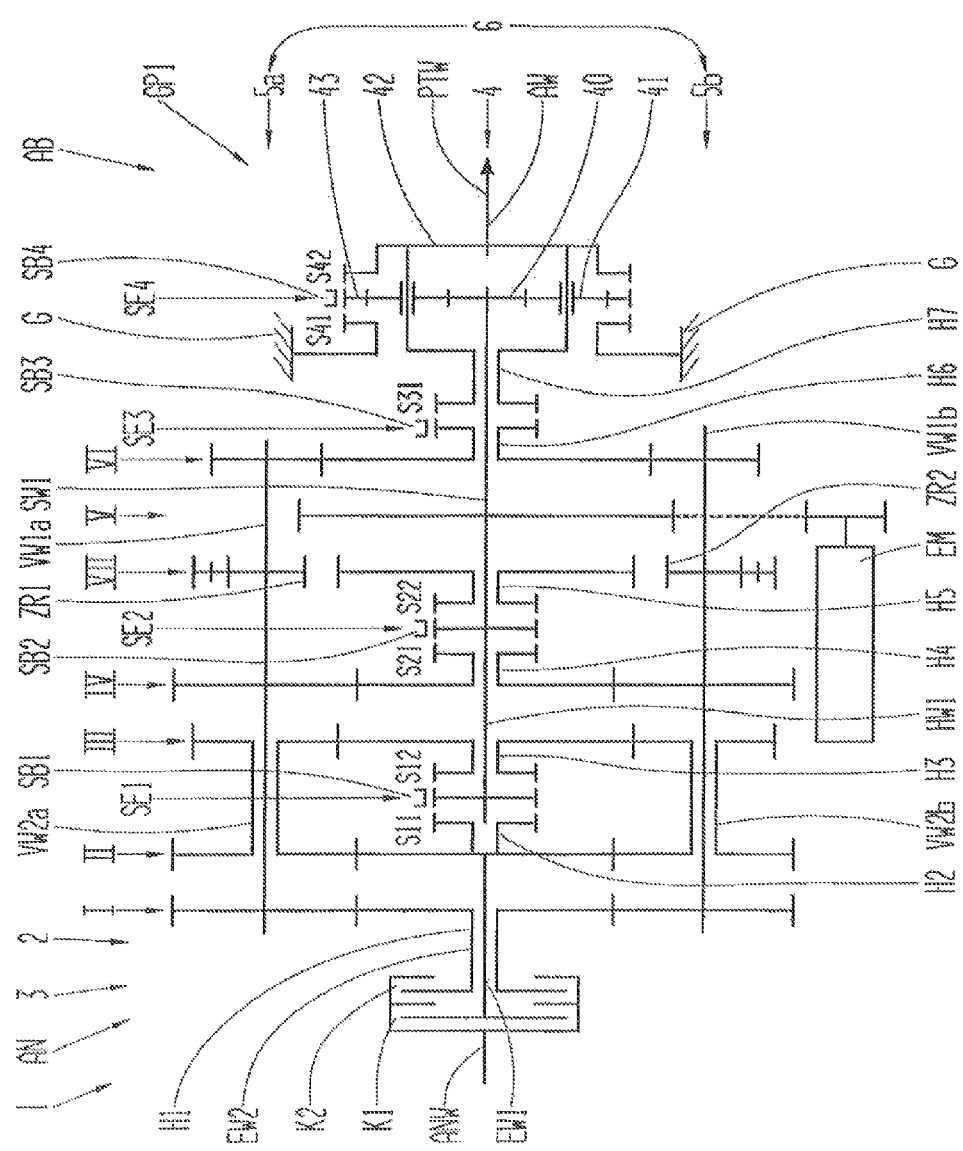
FIG. 21: A transmission according to a fourteenth embodiment of the present invention.

FIG. 21 shows a transmission according to a fourteenth embodiment of the present invention.

FIG. 21 shows a transmission 1 substantially like that of FIG. 1. The difference from the transmission 1 according to FIG. 1 is that an electric machine EM is arranged on at least one transmission element of a further wheel plane, in FIG. 21 a fifth wheel plane V, to hybridize the transmission 1. The electric machine EM is connected by transmission elements to the first main shaft HW1, one of these being connected fixed to the first main shaft HW1. The wheel planes I to IV and V and VI in FIG. 1 correspond to the wheel planes I to IV and VI and VII in FIG. 21. Thus, force and torques can be transmitted from the electric machine EM to the first main shaft HW1.

All in all, the shifting elements S11 to S61 in the transmission 1 according to FIGS. 1 to 21 can also be denoted as coupling devices and in particular can be designed as synchronizers. The shifting devices SE1 to SE6 or the shifting element actuating devices SB1 to SB6 can be designed as dual synchronizers in the case of two shifting elements, or as single synchronizers in the case of one shifting element. Particularly in the transmission 1 according to FIGS. 1 to 21 the transmission elements can either be in the form of a fixed wheel or in the form of a loose wheel. For example, in the transmission 1 according to FIG. 1 the transmission element on the input shaft axis 4 of the second wheel plane II can be a fixed wheel on the first input shaft EW1, since this is connected fixed to the first input shaft EW1. The transmission element of the third wheel plane III on the input shaft axis 4 is a loose wheel on the first main shaft HW1. This can be coupled to the first main shaft HW1 by means of the second shifting element S12.

The transmission elements can in particular be in the form of gearwheels, preferably spur gears, so that the wheel planes I, II, III, IV, V, VI, VII, VIII and IX and X and XI are spur gear stages. To provide various forward and reverse gears, i.e. various transmission ratios, the spur gear stages and in particular their gearwheels can correspondingly have different transmission ratios.

In summary, the present invention offers among others the advantage of enabling a multiplication of the gears as well as lower loading of the transmission elements by virtue of a smaller spread, since no extreme transmission ratios are produced by individual wheel planes. Other advantages are that the transmission has good powershifting ability and good hybridization ability.

Although the present invention has been described above with reference to preferred example embodiments, it is not limited thereto, but can be modified in many ways. For example, various embodiments of FIGS. 1 to 21 can be combined, such as by an axial displacement of the reverse gear stage VI according to FIG. 3 and the arrangement of a second range group as in FIG. 5.

INDEXES

1 Transmission
2 First partial transmission
3 Second partial transmission
4 Input shaft axis
5a, 5b Countershaft axis
6 Countershaft assembly
40, 40' Sun gear
41, 41' Planetary gear
42, 42' Planetary carrier/web
43, 43' Ring gear
EW1, EW2 Input shaft
HW1, HW2 Main shaft
VW1a, VW1b, VW2a, VW2b, VW3a, VW3b, VW4a, VW4b, VW5a Countershaft
SW1, SW2 Sun shaft
PTW Planetary carrier shaft
AW Drive output shaft
GP1, GP2 Planetary gear assembly
G Housing
RG1, RG2 Range group
I, II, III, IV, V, VI, VII, VIII IX, X, XI Wheel plane
H1, H2, H3, H4, H5, H6, H7, H8, H9, H10, H11 Hollow shaft
K1, K2 First/Second powershift element
S11, S12, S21, S22, S31, S41, S42, S51, S52, S61 Shifting element
SE1, SE2, SE3, SE4, SE5, SE6 Shifting device
SB1, SB2, SB3, SB4, SB5, SB6 Shifting element actuating device
SD1 Dual shifting element
ZR1, ZR2 Intermediate wheel
V1, V2, V3, V4, V5, V6, V7, V8, V9, V10, V11, V12, V13, V14, V15 Forward gear
R1, R2 Reverse gear
AN Drive input side
AB Drive output side
EM Electric machine

The invention claimed is:

1. A transmission (1) for a motor vehicle, the transmission comprising:
at least two partial transmissions (2, 3), each of the at least two partial transmissions (2, 3) comprises at least one input shaft (EW1 or EW2), and the at least two input shafts (EW1, EW2) being arranged on a drive input side (AN) of the transmission on an input shaft axis (4),
a drive output shaft on a drive output side (AB) of the transmission being the drive output shaft of both of the two partial transmissions (2, 3),
a countershaft assembly (6) comprising at least one countershaft axis (5a, 5b) with at least two countershafts (VW1a, VW1b, VW2a, VW2b, VW3a, VW3b, VW4a, VW4b, VW5a),
at least one main shaft (HW1, HW2) arranged on the input shaft axis (4),
at least one range group (RG1, RG2) by way of which the at least one main shaft (HW1, HW2) is connectable to the drive output shaft,
at least one of the input shafts (EW1, EW2) being connectable to the drive output shaft by way of at least one of:
at least one wheel plane (I, II, III, IV, V, VI, VII, VIII, IX, X, XI),
at least one shifting element (S11, S12, S21, S22, S31, S41, S42, S51, S52, S61), and
the at least one main shaft (HW1, HW2),
at least four shifting devices (SE1, SE2, SE3, SE4, SE5, S6) are provided, all of the at least four shifting devices (SE1, SE2, SE3, SE4, SE5, S6) are arranged, with respect to torque flow, downstream from the drive input side (AN) of the transmission (1) on the input shaft axis (4), and
at least one of:
at least two of the input shafts (EW1, EW2) are arranged coaxially with one another,
at least two main shafts (HW1, HW2) are arranged coaxially with one another, and
at least two of the countershafts (VW1a, VW1b, VW2a, VW2b, VW3a, VW3b, VW4a, VW4b, VW5a) are arranged coaxially with one another.

2. The transmission according to claim 1, wherein the countershaft assembly (6) has two countershaft axes (5a, 5b), and each of the two countershaft axes has at least two countershafts (VW1a, VW1b, VW2a, VW2b, VW3a, VW3b, VW4a, VW4b, VW5a).

3. The transmission according to claim 1, wherein at least one of:
at least one of the input shafts (EW1, EW2),
at least one of the countershafts (VW1a, VW1b, VW2a, VW2b, VW3a, VW3b, VW4a, VW4b, VW5a), and
at least one of two main shafts (HW1, HW2),
is a hollow shaft (H1, H2, H3, H4, H5, H6, H7, H8, H9, H10, H11) and the respective other shaft is a solid shaft.

4. The transmission according to claim 1, wherein the shifting devices (SE1, SE2, SE3, SE4, SE5, SE6) comprise at least one of:
one shifting element (S11, S12, S21, S22, S31, S41, S42, S51, S52, S61), and
two shifting elements (S11, S12, S21, S22, S31, S41, S42, S51, S52, S61).

5. The transmission according to claim 1, wherein at least one gear, that is obtainable via the transmission (1), is bypassed by way of the countershaft assembly (6) to at least a first two of the at least four shifting devices (SE1, SE2, SE3, SE4, SE5, SE6) arranged, with respect to the torque flow, downstream from the drive input side (AN).

6. The transmission according to claim 1, wherein the transmission is provided with at least one reverse gear (R1, R2).

7. The transmission according to claim 6, wherein the at least one reverse gear (R1, R2) and a first forward gear (V1, V2, V3, V4, V5, V6, V7, V8, V9, V10, V11, V12, V13, V14, V15) are engaged by way of a common powershift element (K1, K2).

8. The transmission according to claim 6, wherein the at least one reverse gear (R1, R2) is actuatable by at least one of the at least four shifting devices (SE1, SE2, SE3, SE4, SE5, SE6), and the at least one of the at least four shifting devices (SE1, SE2, SE3, SE4, SE5, SE6) being a second shifting device (SE1, SE2, SE3, SE4, SE5, SE6) arranged, with respect to the torque flow, downstream from the drive input side (AN).

9. The transmission according to claim 1, wherein the at least one range group (RG1, RG2) is either a planetary gear assembly (GP1, GP2) or a countershaft assembly.

10. The transmission according to claim 1, wherein the transmission is provided with first and second range groups (RG1, RG2), and at least one of the first and the second range groups (RG1, RG2) is either a planetary gear assembly (GP1, GP2) or a countershaft assembly.

11. The transmission according to claim 9, wherein the transmission (1) has a sun shaft (SW1, SW2) on the input shaft axis (4), which is connectable to one of the input shafts (EW1, EW2) and to a sun gear (40, 40') of the planetary gear assembly (GP1, GP2).

12. The transmission according to claim 9, wherein one of the at least four shifting devices (SE1, SE2, SE3, SE4, SE5, SE6) actuates the planetary gear assembly (GP1, GP2) and comprises at least one shifting element (S11, S12, S21, S22, S31, S41, S42, S51, S52, S61) such that, by way of the at least one shifting element (S11, S12, S21, S22, S31, S41, S42, S51, S52, S61), a ring gear (43, 43') of the planetary gear assembly (GP1, GP2) is connectable to a housing (G) of the transmission (1).

13. The transmission according to claim 12, wherein the one of the at least four shifting devices (SE1, SE2, SE3, SE4, SE5, SE6), for actuating the planetary gear assembly (GP1, GP2), comprises two shifting elements (S11, S12, S21, S22, S31, S41, S42, S51, S52, S61), and by way of one of the two shifting elements (S11, S12, S21, S22, S31, S41, S42, S51, S52, S61), the ring gear (43, 43') is connectable to a planetary carrier (42, 42') of the planetary gear assembly (GP1, GP2).

14. The transmission according to claim 1, wherein the transmission is a hybrid transmission (1), and an electric machine (EM) is arranged on at least one of:
at least one transmission element of a wheel plane (I, II, III, IV, V, VI, VII, VIII, IX, X, XI),
at least one countershaft of the at least two countershafts (VW1a, VW1b, VW2a, VW2b, VW3a, VW3b, VW4a, VW4b, VW5a),
at least one of the at least two input shafts (EW1, EW2) on the input shaft axis (4),
by way of at least one of an additional shifting device (SE1, SE2, SE3, SE4, SE5, SE6) and another transmission element connected thereto.

15. The transmission according to claim 1, wherein the at least four shifting devices (SE1, SE2, SE3, SE4, SE5, SE6), at least six wheel planes (I, II, III, IV, V, VI, VII, VIII, IX, X, XI), and the at least one range group (RG1, RG2) are arranged in such manner that at least seven forward gears (V1, V2, V3, V4, V5, V6, V7, V8, V9, V10, V11, V12, V13, V14, V15) and at least two reverse gears (R1, R2) can be fully powershifted with the transmission (1).

16. The transmission according to claim 1, wherein the transmission is provided with at least one drive input constant.

17. The transmission according to claim 1, wherein at least one of the at least four shifting devices (SE1, SE2, SE3, SE4, SE5, SE6) is a dual shifting element (SD1).

18. A transmission (1) for a motor vehicle, the transmission comprising:
at least two partial transmissions (2, 3), each of the at least two partial transmissions (2, 3) comprises at least one input shaft (EW1 or EW2), and the at least two input shafts (EW1, EW2) being arranged on a drive input side (AN) of the transmission on an input shaft axis (4),
a drive output shaft on a drive output side (AB) of the transmission being the drive output shaft of both of the two partial transmissions (2, 3),
a countershaft assembly (6) comprising at least one countershaft axis (5a, 5b) with at least two countershafts (VW1a, VW1b, VW2a, VW2b, VW3a, VW3b, VW4a, VW4b, VW5a),
at least one main shaft (HW1, HW2) arranged on the input shaft axis (4),
at least one range group (RG1, RG2) by way of which the at least one main shaft (HW1, HW2) is connectable to the drive output shaft,
at least one of the input shafts (EW1, EW2) being connectable to the drive output shaft by way of at least one of:
at least one wheel plane (I, II, III, IV, V, VI, VII, VIII, IX, X, XI),
at least one shifting element (S11, S12, S21, S22, S31, S41, S42, S51, S52, S61), and
the at least one main shaft (HW1, HW2),
at least four shifting devices (SE1, SE2, SE3, SE4, SE5, S6) are provided, all of the at least four shifting devices (SE1, SE2, SE3, SE4, SE5, S6) are arranged, with respect to torque flow, downstream from the drive input side (AN) of the transmission (1) on the input shaft axis (4), and
one of the at least four shifting devices (SE1, SE2, SE3, SE4, SE5, SE6) has a single shifting element (S11, S12, S21, S22, S31, S41, S42, S51, S52, S61), which is arranged on the input shaft axis (4) after at least a first two of the at least four shifting devices (SE1, SE2, SE3, SE4, SE5, SE6) arranged, with respect to the torque flow, downstream from the drive input side (AN).

19. A transmission (1) for either a passenger car or a utility vehicle, the transmission comprising:
at least two partial transmissions (2, 3), each of the at least two partial transmissions (2, 3) comprises at least one input shaft (EW1 or EW2), and the at least two input shafts (EW1, EW2) are arranged on a drive input side (AN) of the transmission on an input shaft axis (4), a drive output shaft on a drive output side (AB) of the transmission being the drive output shaft of both partial transmissions (2, 3), a countershaft assembly (6) comprising at least one countershaft axis (5a, 5b) with at least two countershafts (VW1a, VW1b, VW2a, VW2b, VW3a, VW3b, VW4a, VW4b, VW5a), at least one main shaft (HW1, HW2) arranged on the input shaft axis (4), and at least one range group (RG1, RG2) by way of which the at least one main shaft (HW1, HW2) is connectable to the drive output shaft, and at least one of the input shafts (EW1, EW2) is connectable to the drive output shaft by way of at least one of:
at least one wheel plane (I, II, III, IV, V, VI, VII, VIII, IX, X, XI),
at least one shifting element (S11, S12, S21, S22, S31, S41, S42, S51, S52, S61), and
the at least one main shaft (HW1, HW2),
at least four shifting devices (SE1, SE2, SE3, SE4, SE5, S6) are provided, all of the at least four shifting devices (SE1, SE2, SE3, SE4, SE5, S6) are arranged, with respect to torque flow, downstream from the drive input side (AN) of the transmission (1) on the input shaft axis (4), and
at least one of:
at least two of the input shafts (EW1, EW2) are arranged coaxially with one another,
at least two main shafts (HW1, HW2) are arranged coaxially with one another, and
at least two of the countershafts (VW1a, VW1b, VW2a, VW2b, VW3a, VW3b, VW4a, VW4b, VW5a) are arranged coaxially with one another.

* * * * *